(12) United States Patent
Tabata

(10) Patent No.: US 10,008,805 B2
(45) Date of Patent: *Jun. 26, 2018

(54) CONNECTOR DEVICE

(71) Applicant: JAPAN AVIATION ELECTRONICS INDUSTRY, LIMITED, Shibuya-ku, Tokyo (JP)

(72) Inventor: Yuya Tabata, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/722,571

(22) Filed: Oct. 2, 2017

(65) Prior Publication Data

US 2018/0145454 A1    May 24, 2018

(30) Foreign Application Priority Data

Nov. 18, 2016  (JP) ................... 2016-225517

(51) Int. Cl.
*H01R 13/62* (2006.01)
*H01R 13/629* (2006.01)

(52) U.S. Cl.
CPC .............................. *H01R 13/62938* (2013.01)

(58) Field of Classification Search
CPC ........ H01R 13/62938; H01R 13/62933; H01R 13/641
USPC ........................................ 439/157, 372, 489
See application file for complete search history.

(56) References Cited

U.S. PATENT DOCUMENTS

| 6,755,673 B2 * | 6/2004 | Fukushima ...... H01R 13/62938 439/157 |
| 7,438,570 B2 * | 10/2008 | Mori ................ H01R 13/62933 439/157 |
| 7,872,206 B2 * | 1/2011 | Matsunaga ............ H01H 9/085 200/335 |
| 9,018,550 B2 * | 4/2015 | Kobayashi ........... H01H 9/0066 200/50.01 |
| 9,048,045 B2 * | 6/2015 | Henmi ............. H01R 13/62933 |
| 9,325,112 B2 | 4/2016 | Tabata et al. |
| 2018/0054025 A1 | 2/2018 | Tabata et al. |

FOREIGN PATENT DOCUMENTS

| JP | 2002343169 A | 11/2002 |
| JP | 2015050116 A | 3/2015 |

* cited by examiner

*Primary Examiner* — Phuong Chi T Nguyen
(74) *Attorney, Agent, or Firm* — Holtz, Holtz & Volek PC

(57) ABSTRACT

A connector device comprises a connector and a mating connector which is mateable with the connector. The connector comprises a housing, a power-supply terminal and a detection terminal. The mating connector comprises a mating housing, a mating power-supply terminal and a mating detection terminal. One of the housing and the mating housing is provided with a first release portion. One of the housing and the mating housing is provided with a second release portion. One of the housing and the mating housing is provided with a prevention portion. The connector is able to take on any of three states with respect to the mating connector. When the connector is in a first state, the prevention portion is located between the first release portion and the second release portion in an operating direction and prevents the second release portion from being subsequently operated upon operation of the first release portion.

5 Claims, 30 Drawing Sheets

CONNECTOR DEVICE

CROSS REFERENCE TO RELATED APPLICATIONS

This application is based on and claims priority under 35 U.S.C. § 119 to Japanese Patent Application No. JP2016-225517 filed Nov. 18, 2016, the contents of which are incorporated herein in their entirety by reference.

BACKGROUND OF THE INVENTION

This invention relates to a connector device which is mounted on, for example, an electric vehicle or a hybrid car and which relays electric power supplied from a power source system.

A connector device of this type may be used to relay a large current of about 100 A. Accordingly, it is necessary that the connector comprises a mechanism for safety of maintenance workers. A connector device of this type is disclosed in, for example, JPA2002-343169 (Patent Document 1).

As shown in FIGS. 41A-41C, a lever fitting type power source circuit interruption device 800, or a connector device 800, which is disclosed in Patent Document 1, comprises a connector 900, a mating connector 950 and a lever 910. The lever 910 is operably supported by the connector 900. The lever 910 is provided with cam grooves 912 while the mating connector 950 is provided with cam pins 952. The cam pins 952 are inserted in the cam grooves 912, respectively. The connector 900 is provided with a male terminal (not shown), or a power-supply terminal. The male terminal forms a part of a power-supply circuit. The lever 910 is provided with a fitting detection male terminal (not shown), or a detection terminal. The mating connector 950 is provided with a female terminal (not shown), or another power-supply terminal, and a fitting detection female terminal (not shown), or another detection terminal. The female terminal forms another part of the power-supply circuit.

As understood from FIGS. 41A and 41B, when the lever 910 is pushed down, the connector 900 is moved downward, so that the male terminal and the female terminal are connected to each other. Thus, the power-supply circuit is formed. As understood from FIGS. 41B and 41C, when the lever 910 is slid in a horizontal direction, the fitting detection male terminal and the fitting detection female terminal are connected to each other so that the power-supply circuit is energized. In order to detach the connector 900 from the mating connector 950, the aforementioned operations are performed in inverse order. Specifically, at first, the lever 910 is slid in an opposite direction opposite to the direction in the case of the connecting so that the fitting detection male terminal and the fitting detection female terminal are disconnected from each other. Next, the lever 910 is raised to disconnect the male terminal and the female terminal from each other.

In order to protect workers from electric shock, a time, which is elapsed since the disconnection between the fitting detection male terminal and the fitting detection female terminal until the disconnection between the male terminal and the female terminal, must be long enough to securely cut off electric power. In other words, it is necessary that there is a certain time interval between the disconnection of the detection terminals and the disconnection of the power-supply terminals.

However, in the connector device of Patent Document 1, the sliding operation of the lever and the raising operation of the lever can be continuously performed. Hence, in the connector device of Patent Document 1, there is a possibility that the disconnection of the detection terminals and the disconnection of the power-supply terminals are performed almost without a time interval therebetween.

SUMMARY OF THE INVENTION

It is, therefore, an object of the present invention to provide a connector device which can certainly ensure a sufficient time interval between disconnection of a detection terminal from a mating detection terminal and disconnection of a power-supply terminal from a mating power-supply terminal.

One aspect of the present invention provides a connector device comprising a connector and a mating connector which is mateable with the connector. The connector comprises a housing, a power-supply terminal and a detection terminal. Each of the power-supply terminal and the detection terminal is held by the housing. The housing is provided with a first regulated portion and a second regulated portion. The mating connector comprises a mating housing, a mating power-supply terminal and a mating detection terminal. Each of the mating power-supply terminal and the mating detection terminal is held by the mating housing. The mating housing is provided with a first regulating portion and a second regulating portion. One of the housing and the mating housing is provided with a first release portion. One of the housing and the mating housing is provided with a second release portion. One of the housing and the mating housing is provided with a prevention portion. The connector is able to take on any of three states with respect to the mating connector. The three states include a first state, a second state and a third state. When the connector is in the first state, the power-supply terminal is connected with the mating power-supply terminal while the detection terminal is connected with the mating detection terminal. When the connector is in the second state, the power-supply terminal is connected with the mating power-supply terminal while the detection terminal is not connected with the mating detection terminal. When the connector is in the third state, the power-supply terminal is not connected to the mating power-supply terminal while the detection terminal is not connected to the mating detection terminal. When the connector is tried to transition from the first state to the second state, the first regulated portion is brought into abutment with the first regulating portion and regulated to prevent the connector from transitioning to the second state. When the first release portion is operated along an operating direction, regulation by the first regulating portion for the first regulated portion is released. When the connector is tried to transition from the second state to the third state, the second regulated portion is brought into abutment with the second regulating portion and regulated to prevent the connector from transitioning to the third state. When the second release portion is operated, regulation by the second regulating portion for the second regulated portion is released. When the connector is in the first state, the prevention portion is located between the first release portion and the second release portion in the operating direction and prevents the second release portion from being subsequently operated upon operation of the first release portion.

When the connector is tried to transition from the first state to the second state, the first regulated portion is brought into abutment with the first regulating portion and regulated to prevent the connector from transitioning to the second state. In order to release the regulation, it is necessary to operate the first release portion. Moreover, when the connector is tried to transition to the third state after the regulation by the first regulating portion for the first regulated portion is released, the second regulated portion is brought into abutment with the second regulating portion and regulated to prevent the connector from transitioning from the second state to the third state. In order to release the regulation, it is necessary to operate the second release portion. Like this, in order that the connector transitions from the first state to the third state via the second state, it is necessary to operate the first release portion and the second release portion separately. Consequently, the connector device can certainly ensure a sufficient time which is elapsed since electrical disconnection between the detection terminal and the mating detection terminal until electrical disconnection between the power-supply terminal and the mating power-supply terminal.

Especially, in the connector device of the present invention, the prevention portion is located between the first release portion and the second release portion in the operating direction when the connector is in the first state. Accordingly, when the connector is in the first state, the second release portion is prevented from being subsequently operated upon operation of the first release portion. Specifically, even if an orientation, in which the first release portion is operated, and an orientation, in which the second release portion is operated, coincide with each other, it is necessary to operate the first release portion and the second release portion separately and independently when the connector transitions from the first state to the third state via the second state. Consequently, the connector device can more certainly ensure a sufficient time which is elapsed since the electrical disconnection between the detection terminal and the mating detection terminal until the electrical disconnection between the power-supply terminal and the mating power-supply terminal.

Figure 1:
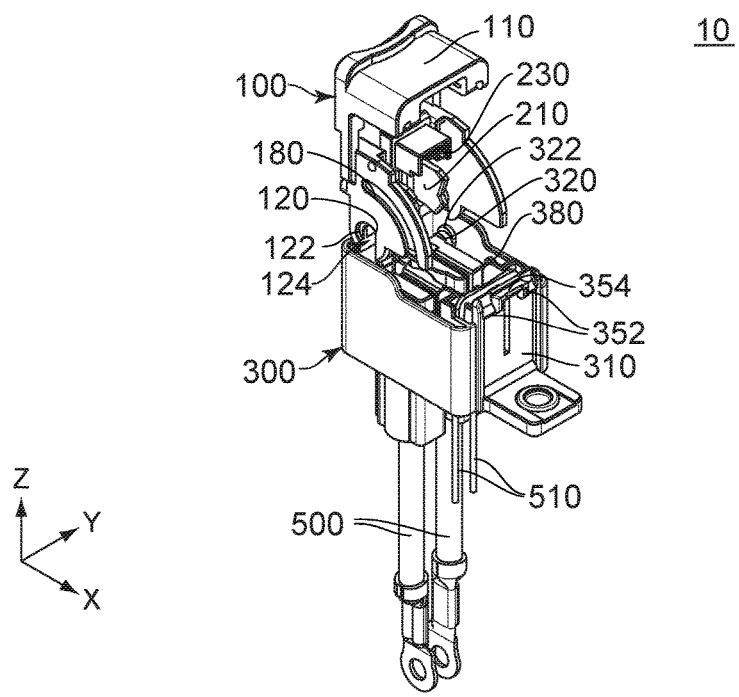
FIG. 1 is a perspective view showing a connector device according to a first embodiment of the present invention, wherein a connector is separated from a mating connector.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

First Embodiment

As shown in FIG. 1, a connector device 10 according to a first embodiment of the present invention comprises a connector 100 and a mating connector 300. The mating connector 300 is mateable with the connector 100. When the mating connector 300 is used, it is attached to an object (not shown) such as an electric vehicle and connected to a power-supply system (not shown) and a motor (not shown). When the connector 100 is mated with the mating connector 300, the connector device 10 connects the power-supply system to the motor, and a current supplied from the power-supply system is supplied to the motor.

Figure 3:
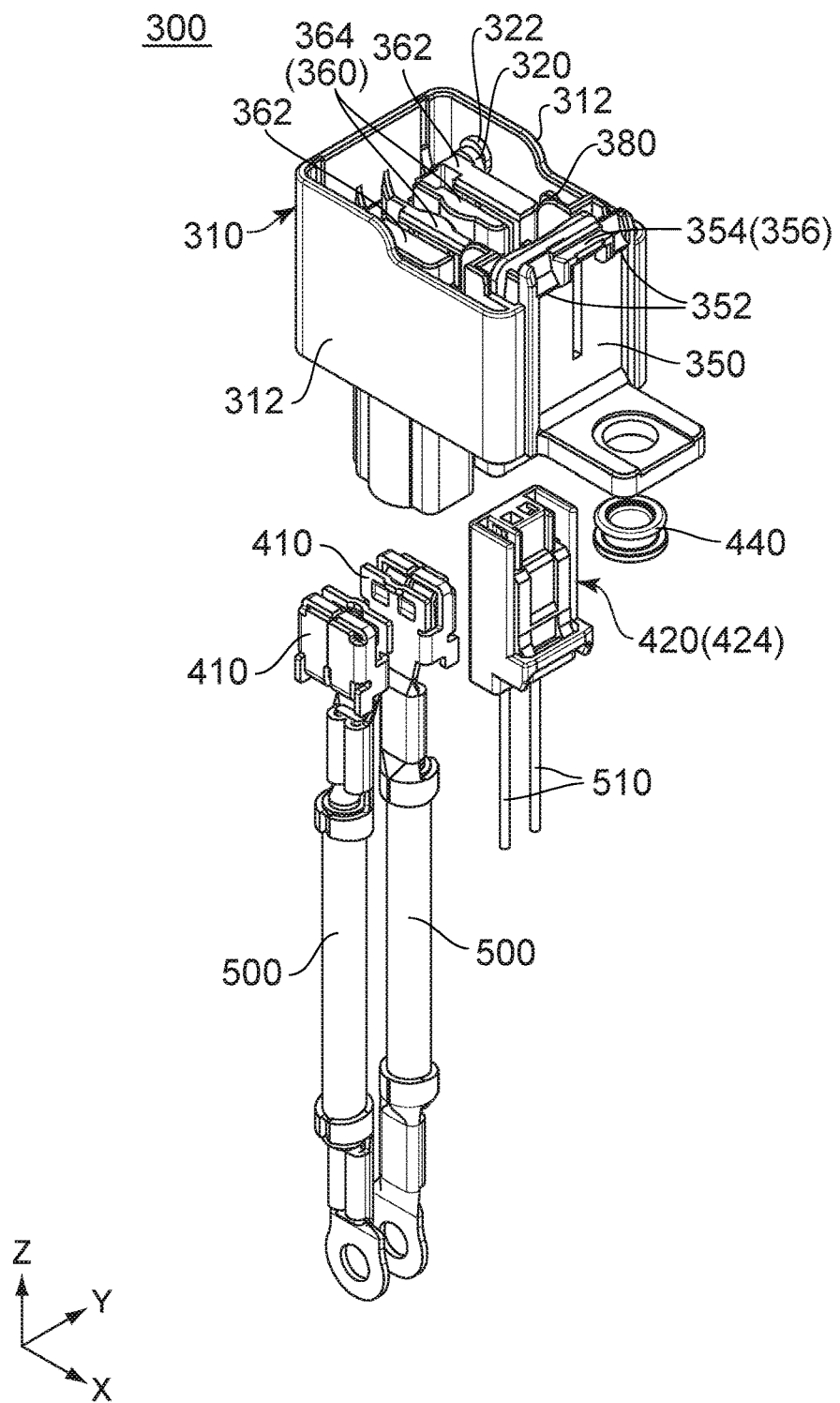
FIG. 3 is an exploded, perspective view showing the mating connector which is included in the connector device of FIG. 1.

As shown in FIG. 3, the mating connector 300 comprises a mating housing 310, two mating power-supply terminals 410, a mating sub-connector 420 and an eyelet 440.

Referring to FIG. 3, the mating housing 310 is formed with two mating axis portions 320 and two mating guide portions 380. The mating axis portions 320 are rotation axes which have an axis direction extending along a Y-direction. The mating axis portions 320 are located away from each other in the axis direction and arranged in symmetrical positions. A set of the mating axis portions 320 has two outer ends in the axis direction. The outer ends of the mating axis portions 320 are formed with flanges 322, respectively. The mating axis portions 320 and the flanges 322 form two combinations. In each of the combinations of the mating axis portions 320 and the flanges 322, the flange 322 overhangs from the mating axis portion 320 at least upward and downward in a perpendicular plane perpendicular to the axis direction. In the present embodiment, the mating housing 310 has a pair of sidewalls 312 and two sets of power-supply terminal holding portions 360. As understood from FIGS. 3 and 10, each of the power-supply terminal holding portions 360 has an outer power-supply terminal holding portion 362, an inner power-supply terminal holding portion 364 and a power-supply terminal holding protrusion 366. The combinations of the mating axis portions 320 and the flanges 322 correspond to the sidewalls 312, respectively. The combinations of the mating axis portions 320 and the flanges 322 correspond to the power-supply terminal holding portions 360, respectively. Each of the combinations of the mating axis portions 320 and the flanges 322 is located between the sidewall 312 corresponding thereto and the outer power-supply terminal holding portion 362 corresponding thereto. At least one of the mating axis portion 320 and the flange 322 is supported by one of the outer power-supply terminal holding portion 362 and the sidewall 312. In the present embodiment, each of the mating axis portions 320 is supported by the outer power-supply terminal holding portion 362 corresponding thereto while each of the flanges 322 is supported by the sidewall 312 corresponding thereto. In the present embodiment, the perpendicular plane is an XZ-plane. An up-down direction is a Z-direction. A positive Z-direction is directed upward while a negative Z-direction is directed downward. The mating guide portions 380 are protrusions and protrude inward from the sidewalls 312, respectively, in the axis direction. The mating guide portions 380 are opposed to each other in the axis direction.

Figure 6:
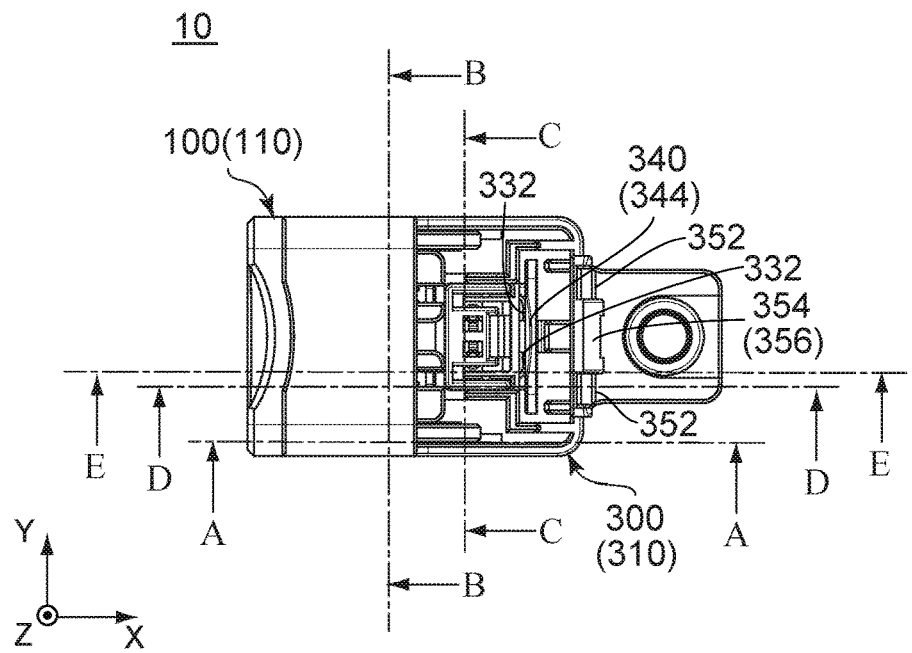
FIG. 6 is a top view showing the connector device of FIG. 4.
Figure 10:
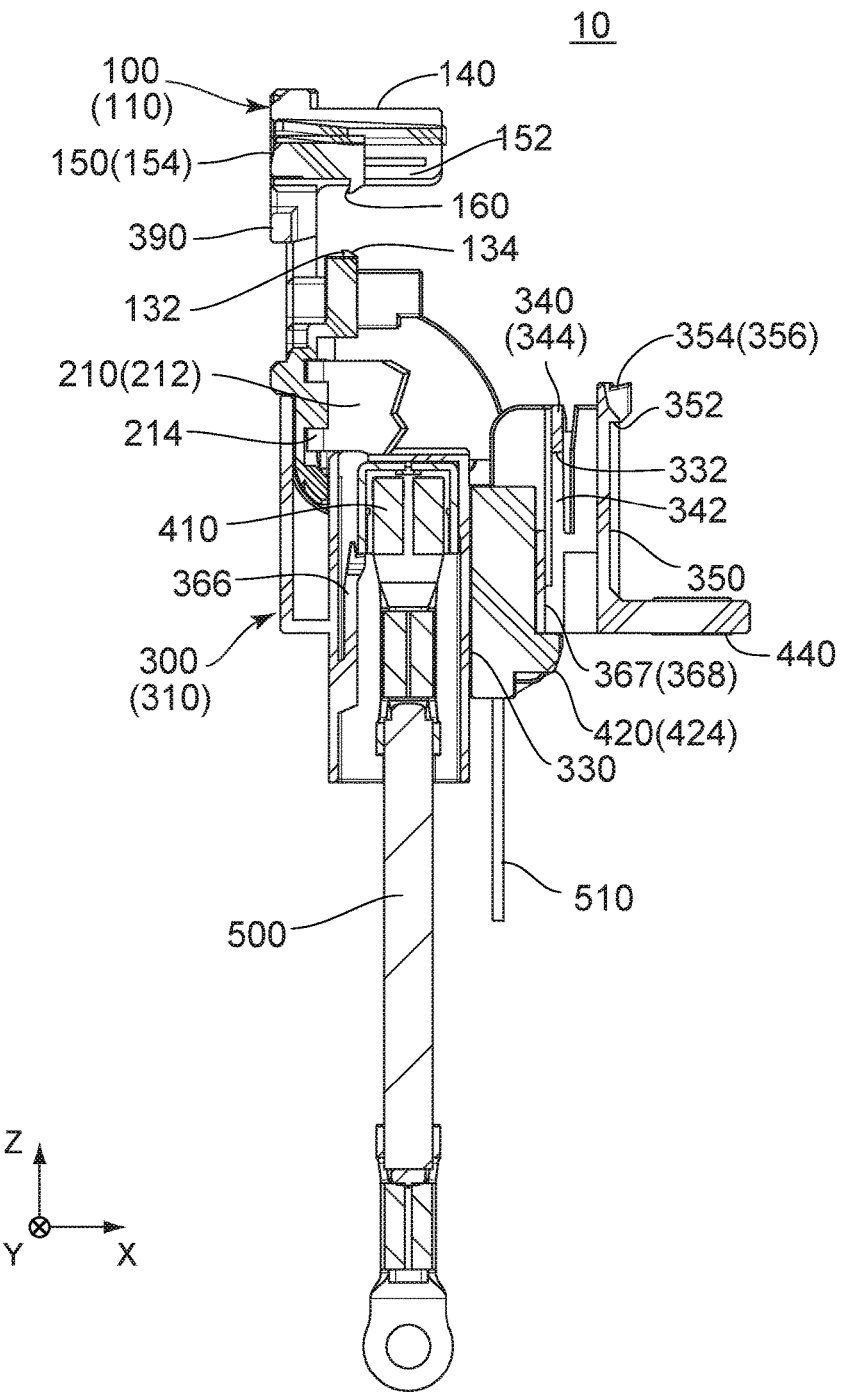
FIG. 10 is a cross-sectional view showing the connector device of FIG. 6, taken along line D-D.
Figure 26:
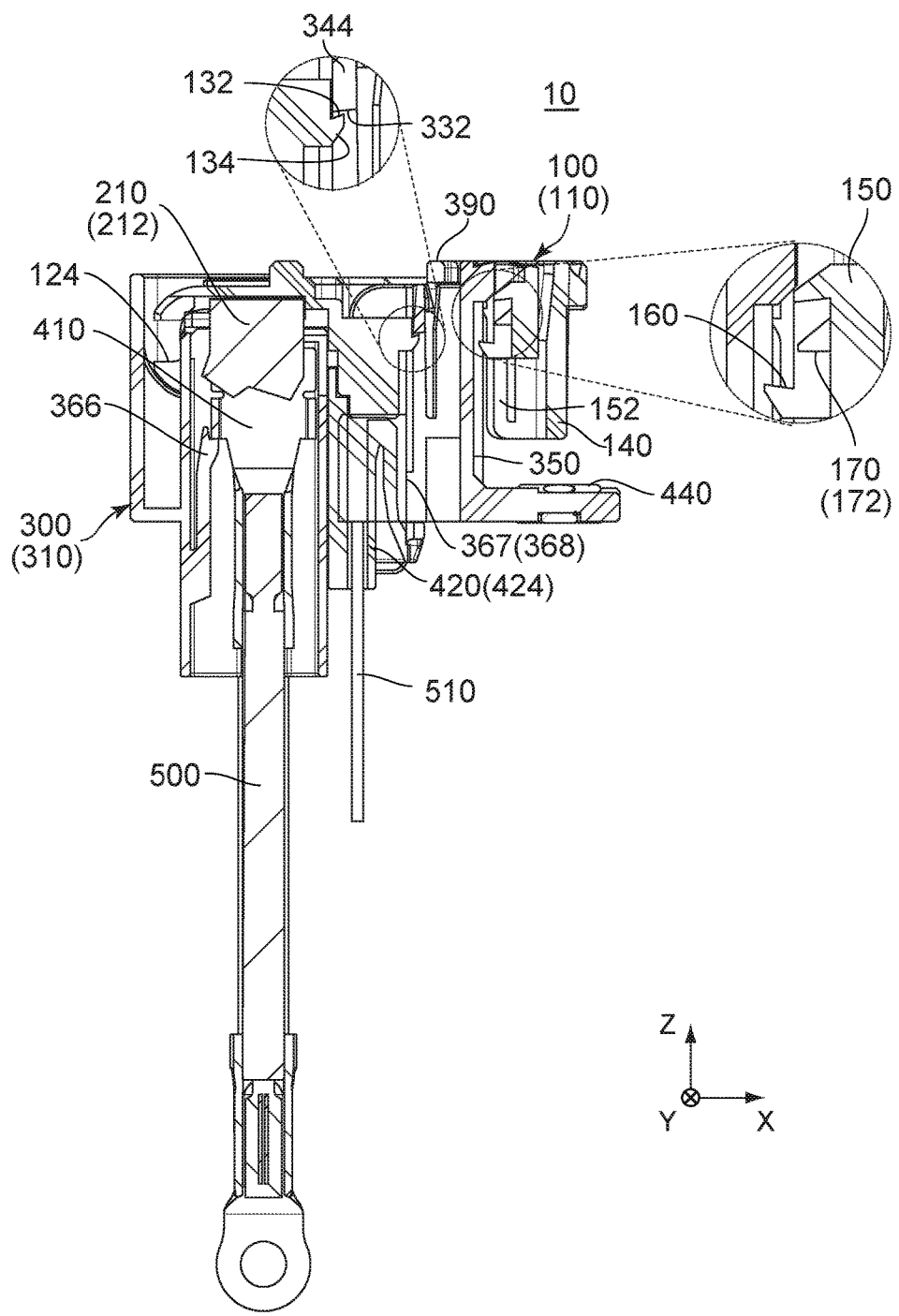
FIG. 26 is a cross sectional view showing the connector device of FIG. 22, taken along line N-N, wherein the first regulating portion and its surroundings are illustrated enlarged while the fitting regulated portion and its surroundings are illustrated enlarged.

As understood from FIGS. 6 and 10, the mating housing 310 has a mating sub-connector holding portion 367, two first regulating portions 332 and a first release portion 340. The mating sub-connector holding portion 367 has a wall portion 368 which is located rearward thereof in a front-rear direction perpendicular to the axis direction. In the present embodiment, the front-rear direction is an X-direction. A negative X-direction is directed forward while a positive X-direction is directed rearward. The first release portion 340 is operable in a first operating orientation. The first operating orientation is an orientation extending away from the rotation axis 320, or the mating axis portion 320, in a radial direction around the rotation axis 320. In other words, the first operating orientation is the orientation extending away from the rotation axis 320 in the radial direction of a cylindrical coordinates system centered on the rotation axis 320. The cylindrical coordinates system centered on the rotation axis 320 is hereinafter referred to as "specific cylindrical coordinates system". More specifically, the first operating orientation of the present embodiment coincides with a rearward direction. The first release portion 340 has a first spring portion 342 and a first operation portion 344. The first spring portion 342 protrudes rearward in the front-rear direction from the wall portion 368 of the mating sub-connector holding portion 367 of the mating housing 310, and then extends upward in the up-down direction perpendicular to both of the axis direction and the front-rear direction. In other words, the first spring portion 342 has a cantilever structure. The first operation portion 344 is located at an upper end of the first spring portion 342 and supported by the first spring portion 342. Each of the first regulating portions 332 is located at a lower end of the first operation portion 344. As shown in FIGS. 10 and 26, each of the first regulating portions 332 has a lower surface. The lower surface of the first regulating portion 332 obliquely intersects with the up-down direction to be inclined forward and downward.

As understood from FIGS. 6 and 10, the first spring portion 342 is resiliently deformable. Operation of the first operation portion 344 causes the first spring portion 342 to be resiliently deformed. Therefore, the first regulating portions 332 can be moved at least in the front-rear direction.

Figure 11:
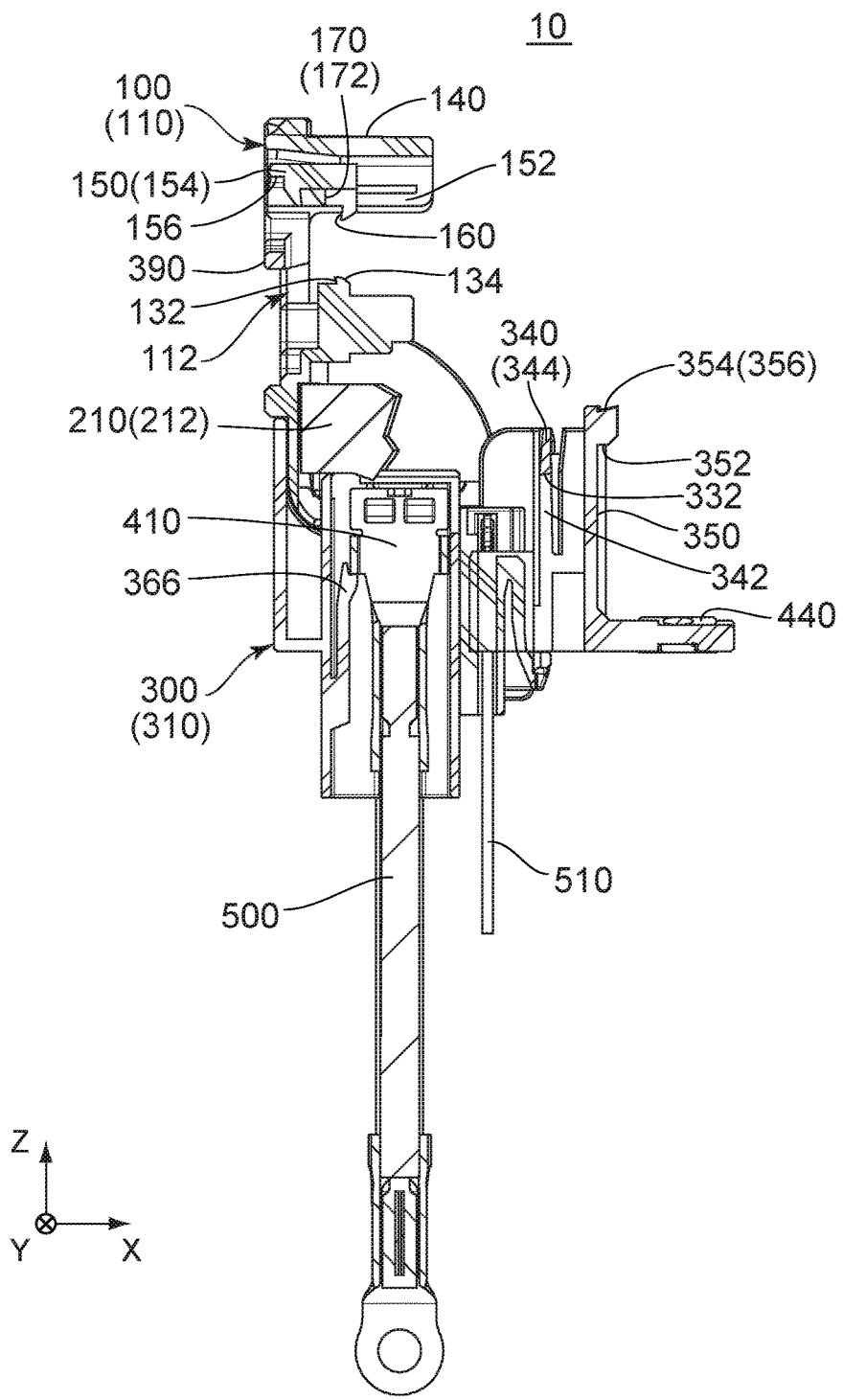
FIG. 11 is a cross-sectional view showing the connector device of FIG. 6, taken along line E-E.
Figure 12:
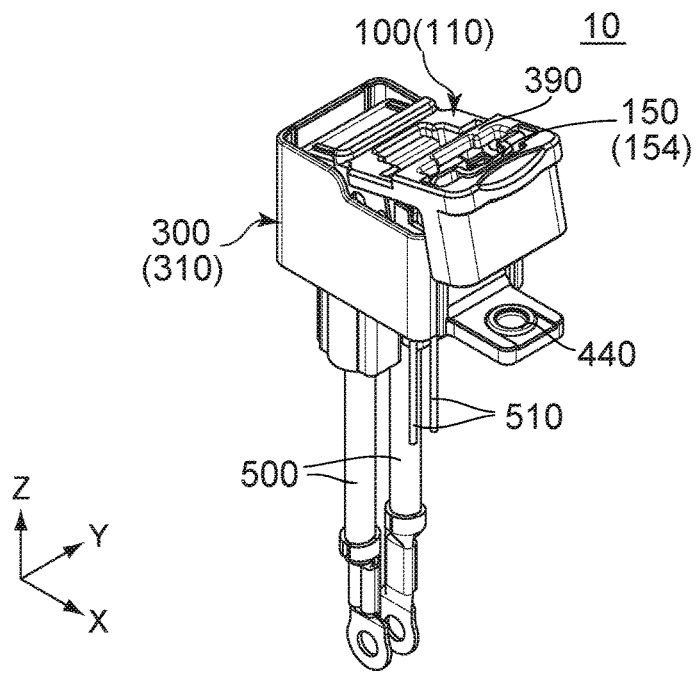
FIG. 12 is yet another perspective view showing the connector device of FIG. 1, wherein the connector is in a fourth state.
Figure 13:
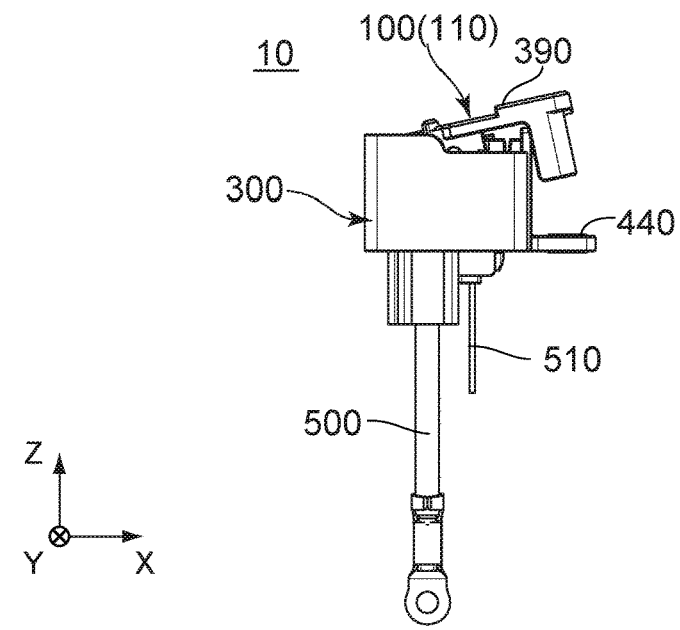
FIG. 13 is a side view showing the connector device of FIG. 12.
Figure 14:
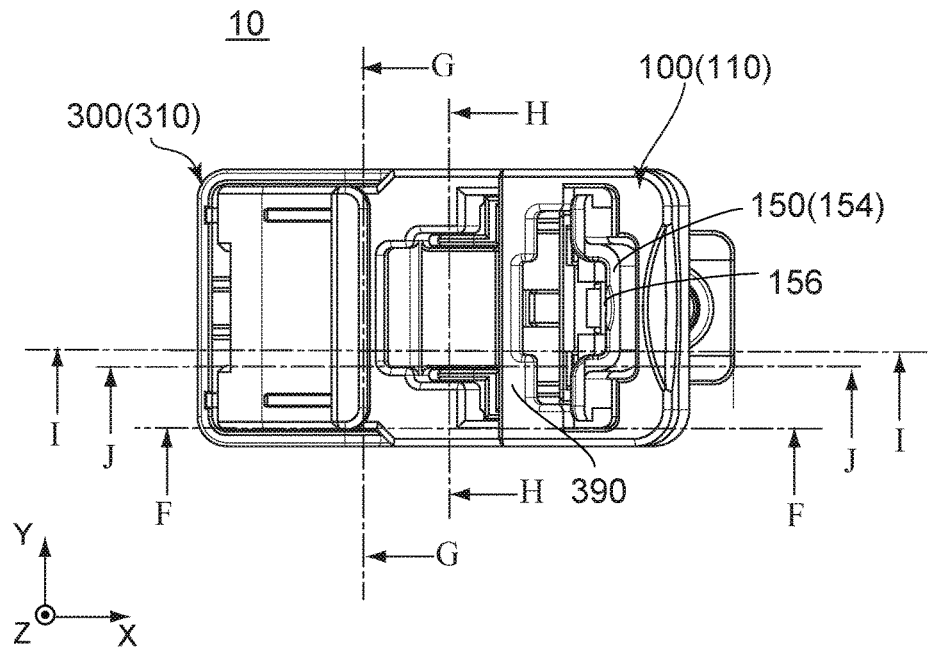
FIG. 14 is a top view showing the connector device of FIG. 12.
Figure 15:
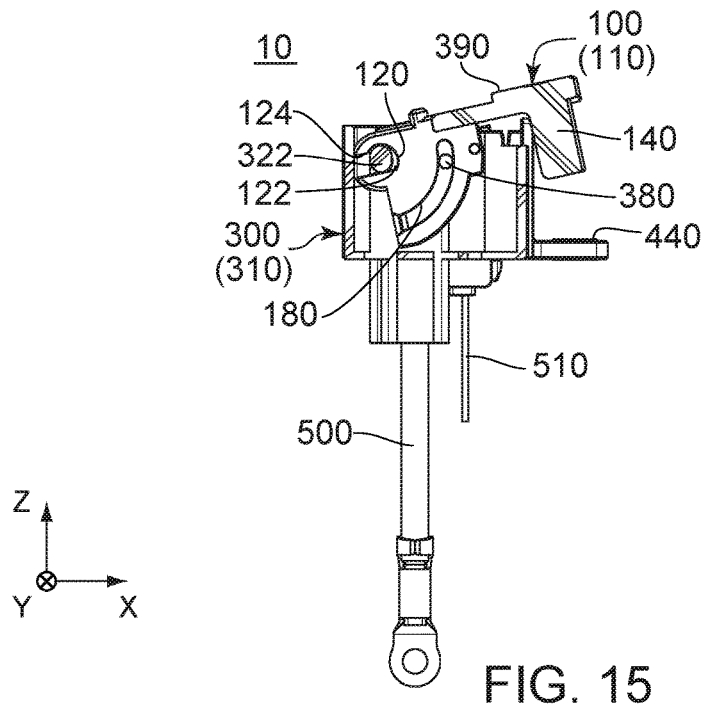
FIG. 15 is a cross-sectional view showing the connector device of FIG. 14, taken along line F-F.

As shown in FIG. 10, the mating housing 310 further has a rear wall 350. The rear wall 350 is located in a rear part of the mating housing 310 in the front-rear direction and extends in the up-down direction. The rear wall 350 is formed with two second regulating portions 352 and a fitting regulating portion 354, or an additional regulating portion 354. Each of the second regulating portions 352 and the fitting regulating portion 354 protrudes rearward. The fitting regulating portion 354 protrudes rearward beyond the second regulating portion 352. As shown in FIG. 3, the second regulating portions 352 are located outside the fitting regulating portion 354 in the axis direction. As shown in FIG. 10, each of the second regulating portions 352 has a lower surface and an upper surface. The lower surface of the second regulating portion 352 is perpendicular to the up-down direction while the upper surface of the second regulating portion 352 obliquely intersects with the up-down direction. The fitting regulating portion 354 has a lower surface. As understood from FIG. 3, the lower surface of the fitting regulating portion 354 obliquely intersects with the up-down direction. Specifically, the lower surface of the fitting regulating portion 354 is inclined rearward. As shown in FIG. 11, the fitting regulating portion 354 has an upper surface as an abutment surface 356, or a second abutment surface 356. The abutment surface 356 obliquely intersects with the up-down direction. In other words, the abutment surface 356 of the fitting regulating portion 354 intersects with a horizontal plane perpendicular to the up-down direction. The abutment surface 356 is inclined forward and downward.

Figure 8:
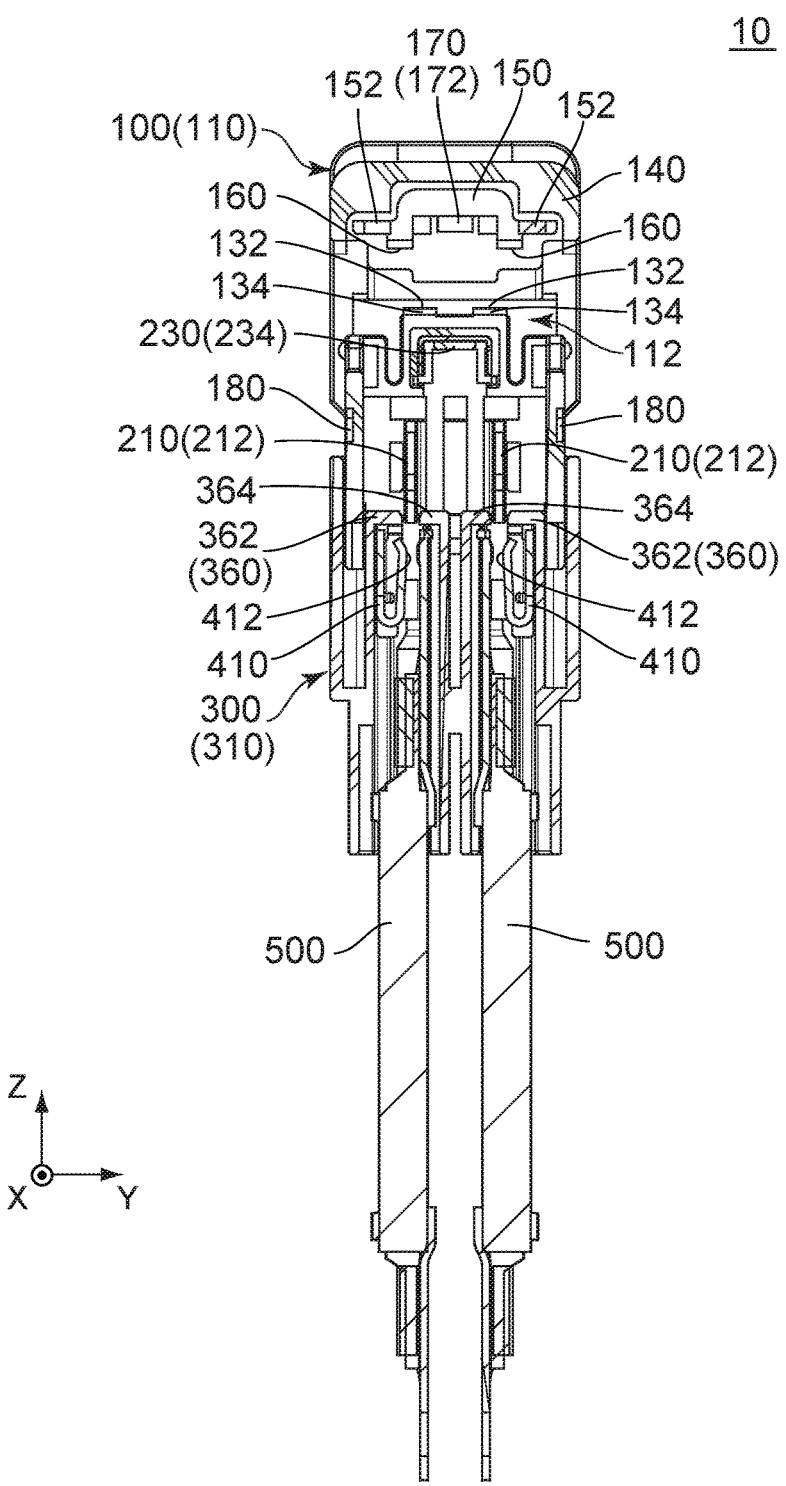
FIG. 8 is a cross-sectional view showing the connector device of FIG. 6, taken along line B-B.

As shown in FIGS. 8 and 10, the mating power-supply terminals 410 are so-called socket contacts. As shown in FIGS. 8, 16, 24 and 32, each of the mating power-supply terminals 410 is provided with a contact 412. The contact 412 of the present embodiment is movable at least outward in the axis direction. As shown in FIGS. 8 and 10, the mating power-supply terminals 410 are connected with power cables 500, respectively. The mating power-supply terminals 410 are held into the power-supply terminal holding portions 360 of the mating housing 310 by the power-supply terminal holding protrusions 366 of the power-supply terminal holding portions 360, respectively, and are positioned into the power-supply terminal holding portions 360 of the mating housing 310. Each of the mating power-supply terminals 410 is relatively immovable with respect to the mating housing 310. The mating power-supply terminals 410 are located away from each other in the axis direction.

Figure 17:
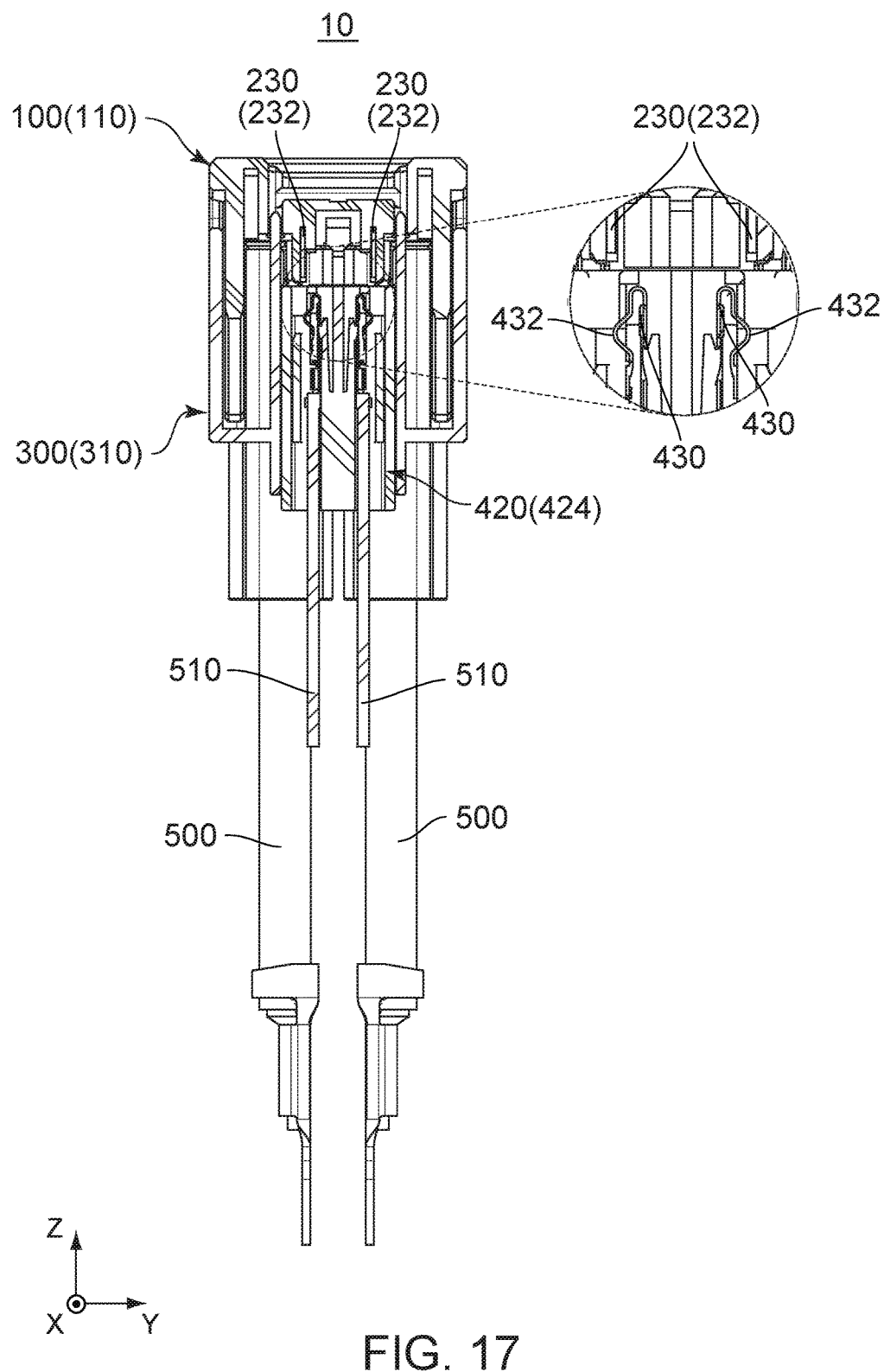
FIG. 17 is a cross-sectional view showing the connector device of FIG. 14, taken along line H-H, wherein contacts of mating detection terminals and their surroundings are illustrated enlarged.
Figure 25:
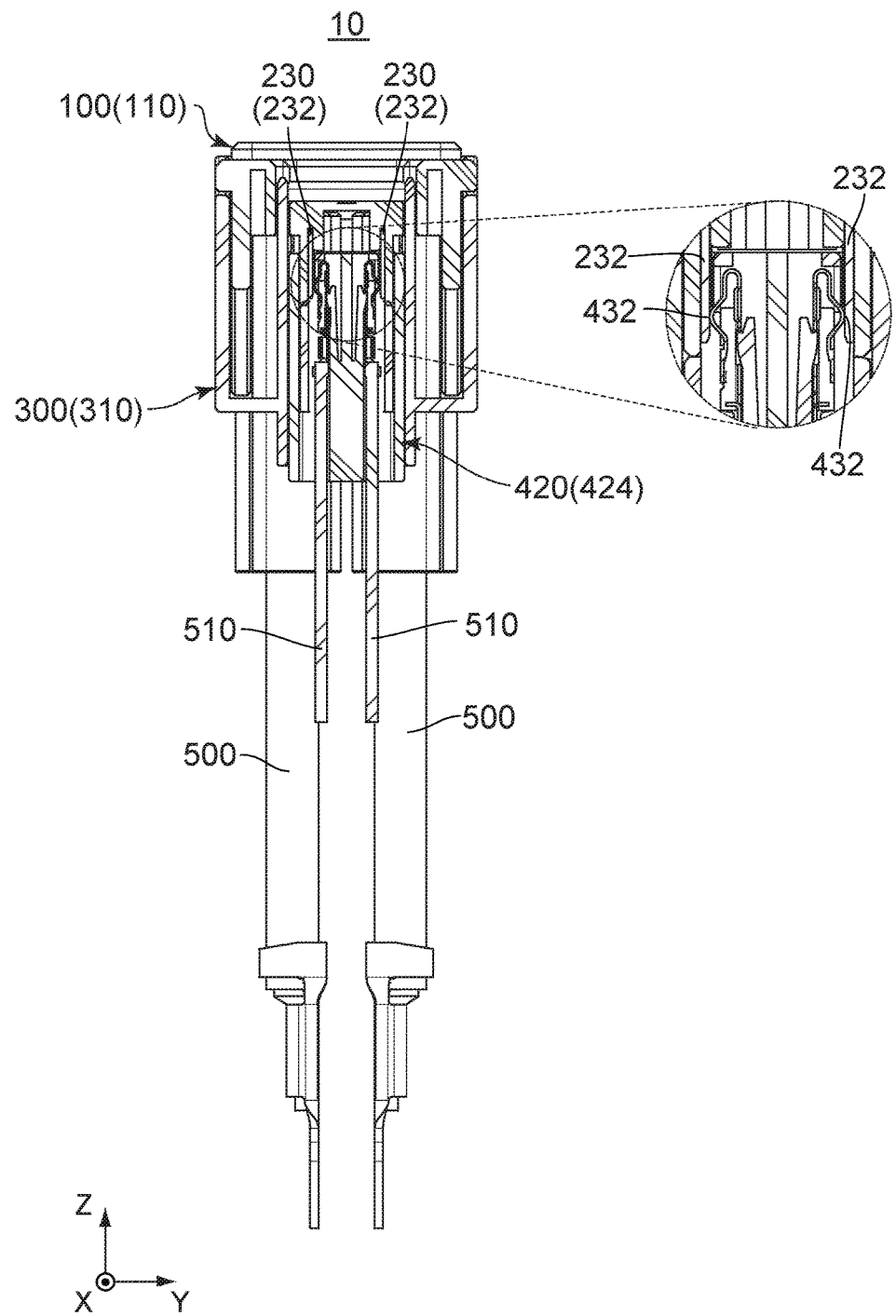
FIG. 25 is a cross-sectional view showing the connector device of FIG. 22, taken along line M-M, wherein the contacts of the mating detection terminals and their surroundings are illustrated enlarged.
Figure 33:
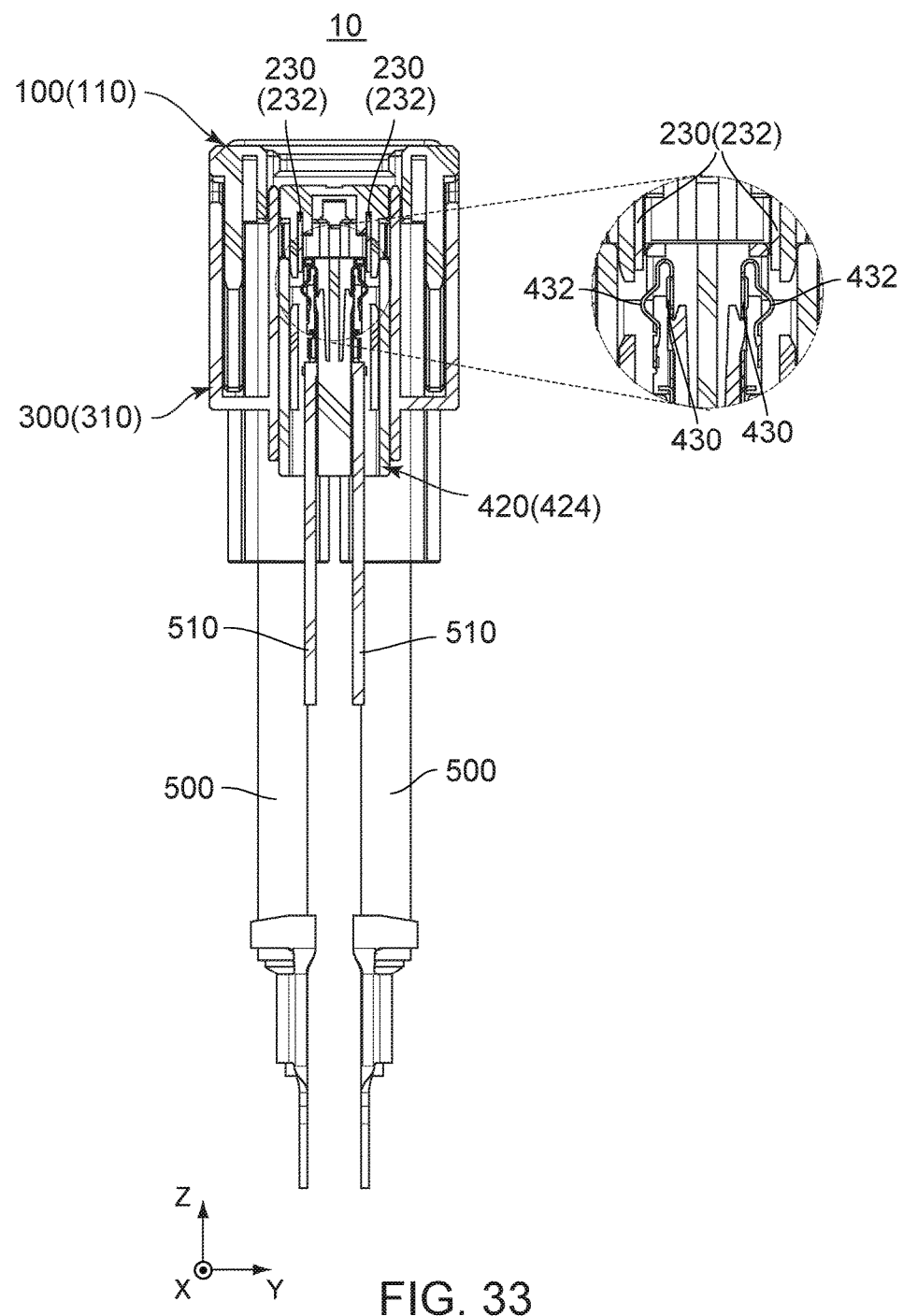
FIG. 33 is a cross-sectional view showing the connector device of FIG. 30, taken along line R-R, wherein the contacts of the mating detection terminals and their surroundings are illustrated enlarged.

As shown in FIGS. 17, 25 and 33, the mating sub-connector 420 comprises a sub-housing 424 and two mating detection terminals 430. The mating detection terminals 430 are held by and fixed to the sub-housing 424. Moreover, the mating sub-connector 420 is held by and fixed to the mating housing 310. In other words, the mating detection terminals 430 are held by the mating housing 310 through the sub-housing 424 of the mating sub-connector 420. Thus, each of the mating detection terminals 430 is relatively immovable with respect to the mating housing 310. In detail, the mating detection terminals 430 are located away from each other in the axis direction and connected with signal lines 510, respectively. In addition, each of the mating detection terminals 430 is provided with a contact 432. The contact 432 of the present embodiment is movable at least inward in the axis direction.

Figure 4:
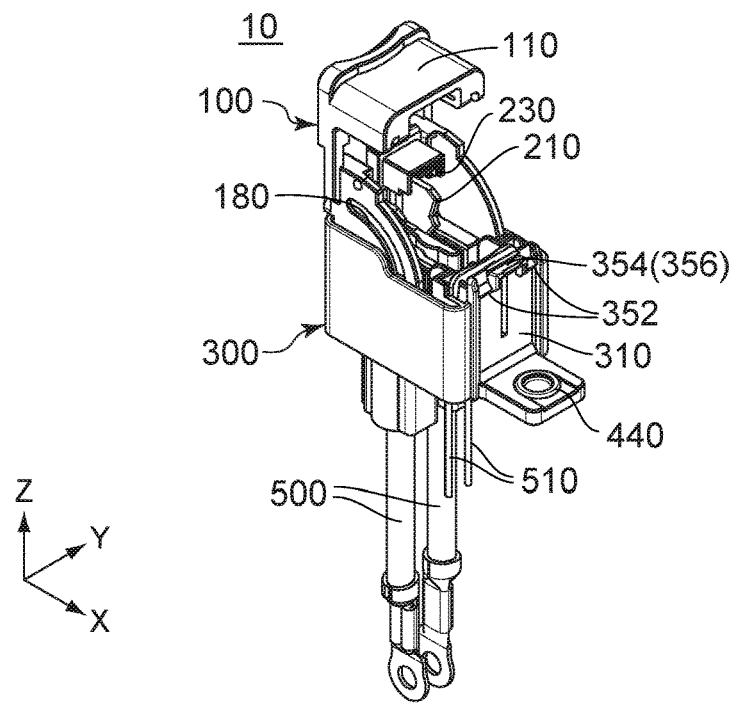
FIG. 4 is another perspective view showing the connector device of FIG. 1, wherein the connector is in a third state.
Figure 5:
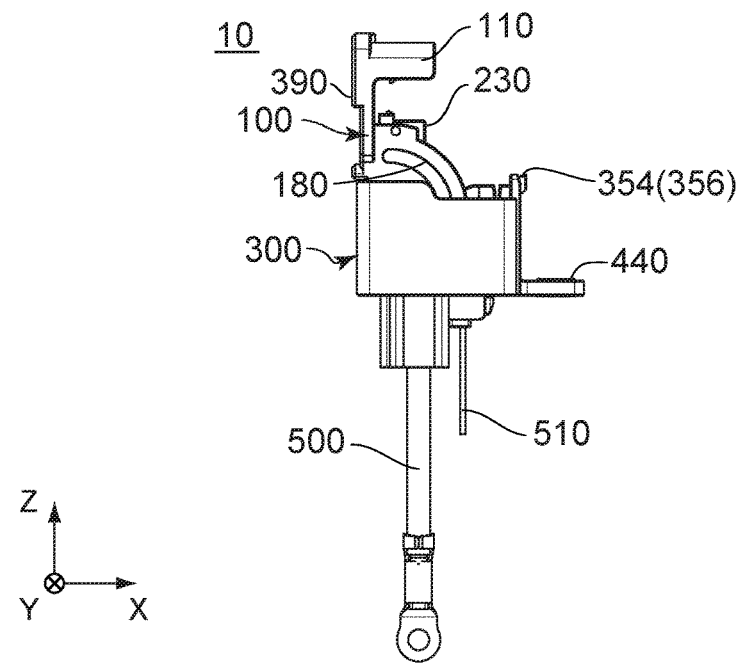
FIG. 5 is a side view showing the connector device of FIG. 4.
Figure 18:
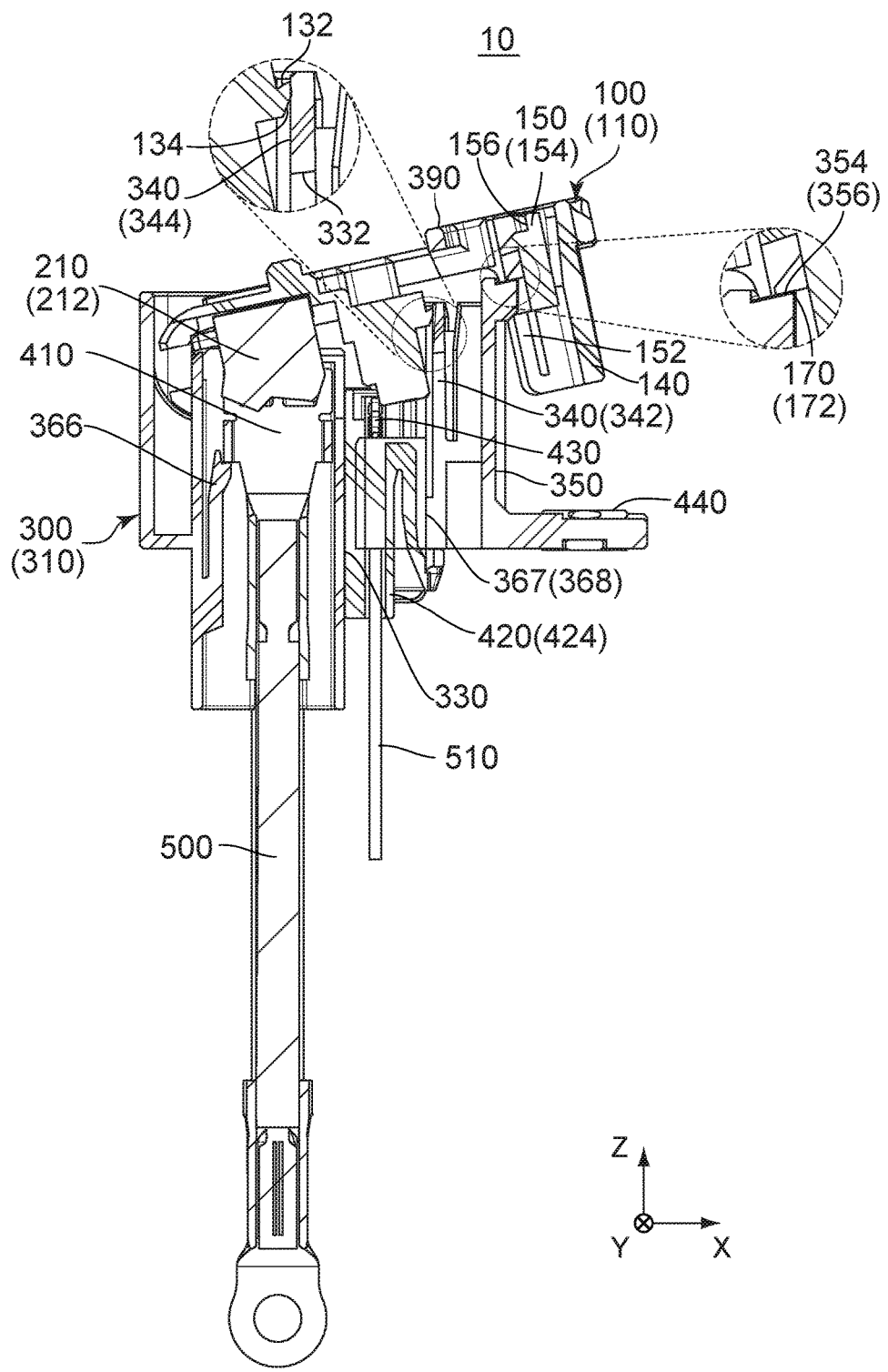
FIG. 18 is a cross-sectional view showing the connector device of FIG. 14, taken along line I-I, wherein a first regulating portion and its surroundings are illustrated enlarged while a fitting regulated portion and its surroundings are illustrated enlarged.
Figure 19:
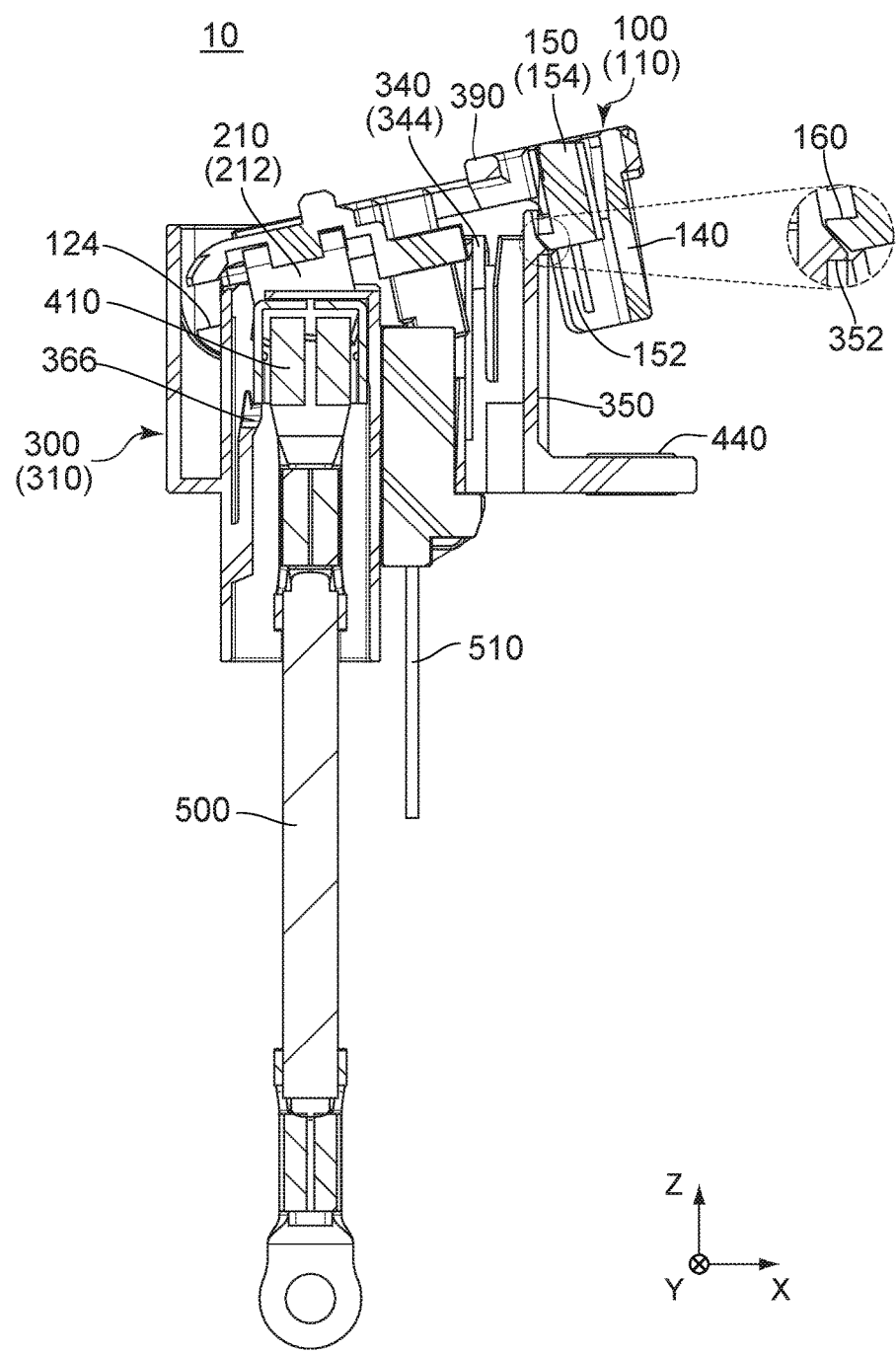
FIG. 19 is a cross-sectional view showing the connector device of FIG. 14, taken along line J-J, wherein a second regulating portion and its surroundings are illustrated enlarged.
Figure 20:
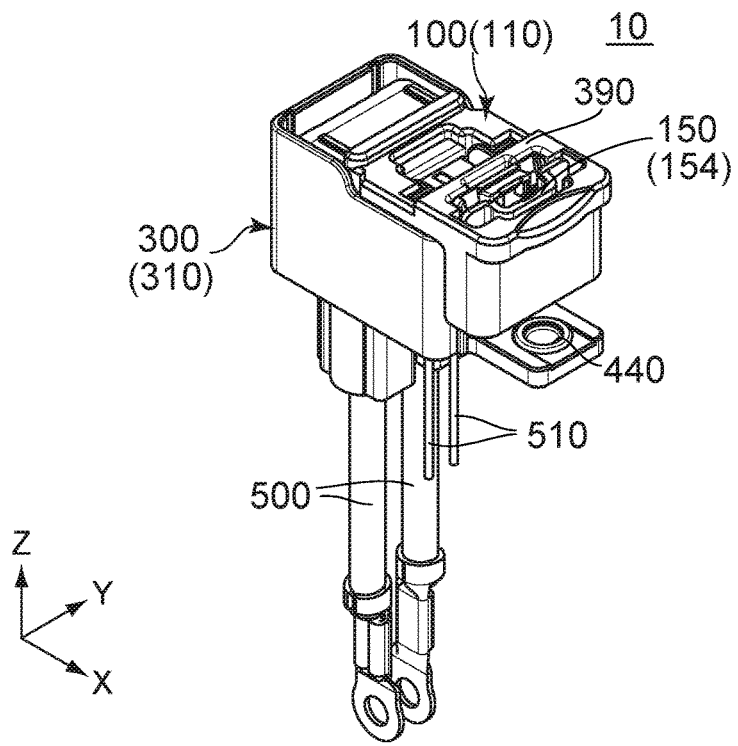
FIG. 20 is still another perspective view showing the connector device of FIG. 1, wherein the connector is in a first state.
Figure 21:
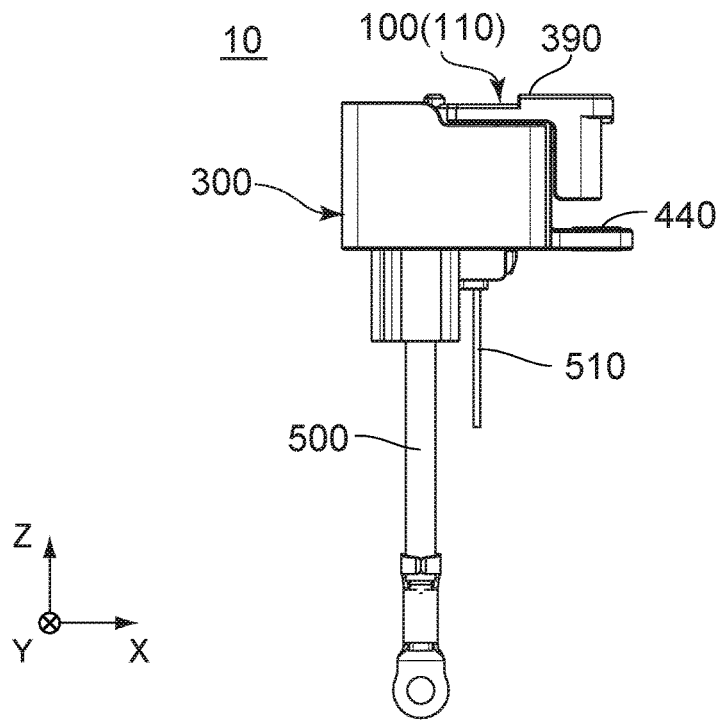
FIG. 21 is a side view showing the connector device of FIG. 20.
Figure 27:
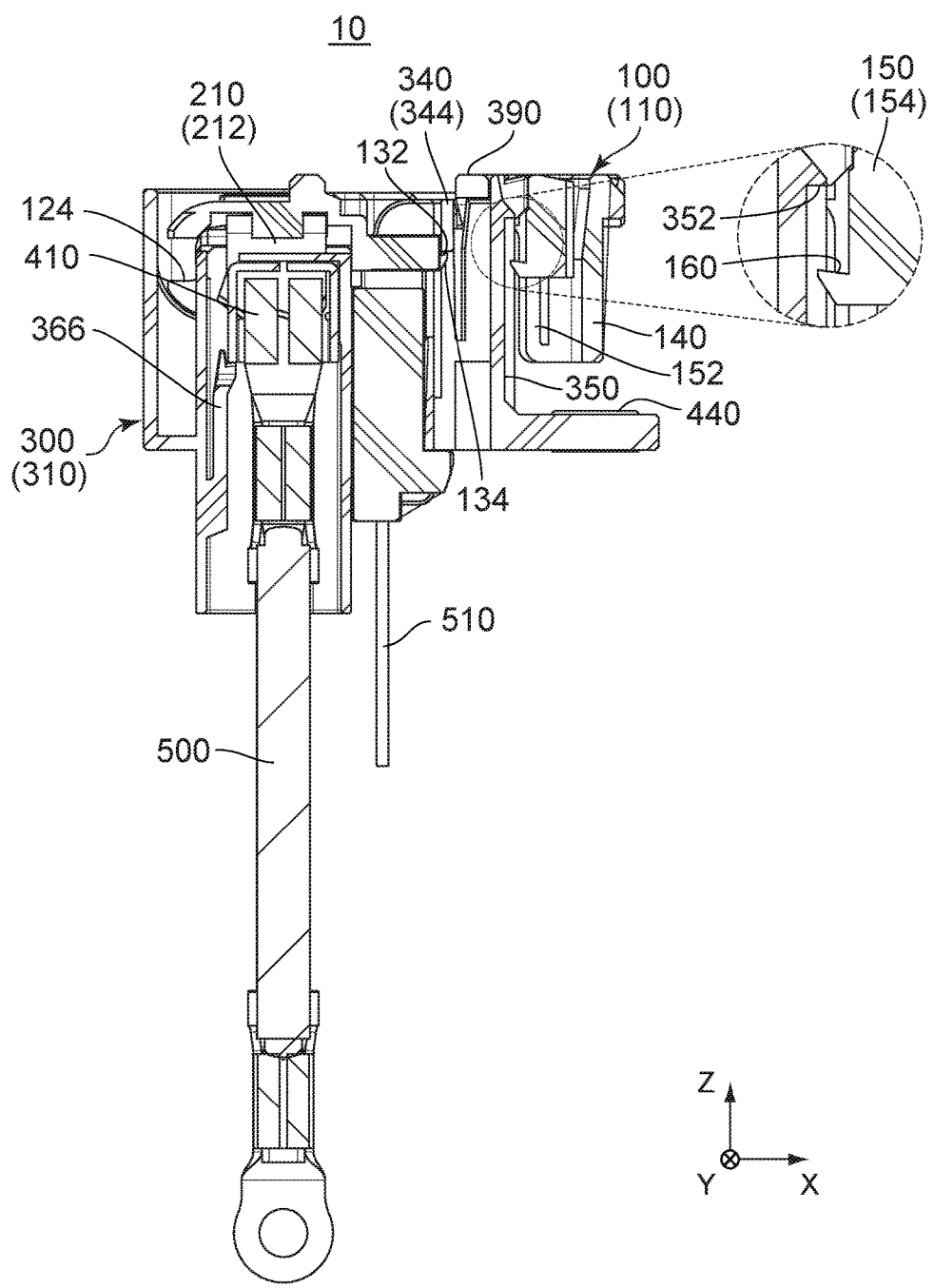
FIG. 27 is a cross-sectional view showing the connector device of FIG. 22, taken along line O-O, wherein the second regulating portion and its surroundings are illustrated enlarged.
Figure 28:
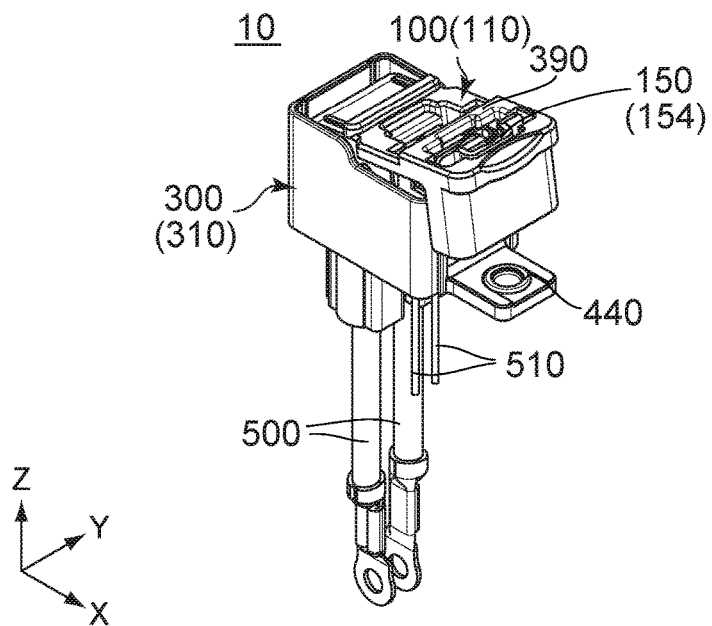
FIG. 28 is still yet another perspective view showing the connector device of FIG. 1, wherein the connector is in a second state.
Figure 29:
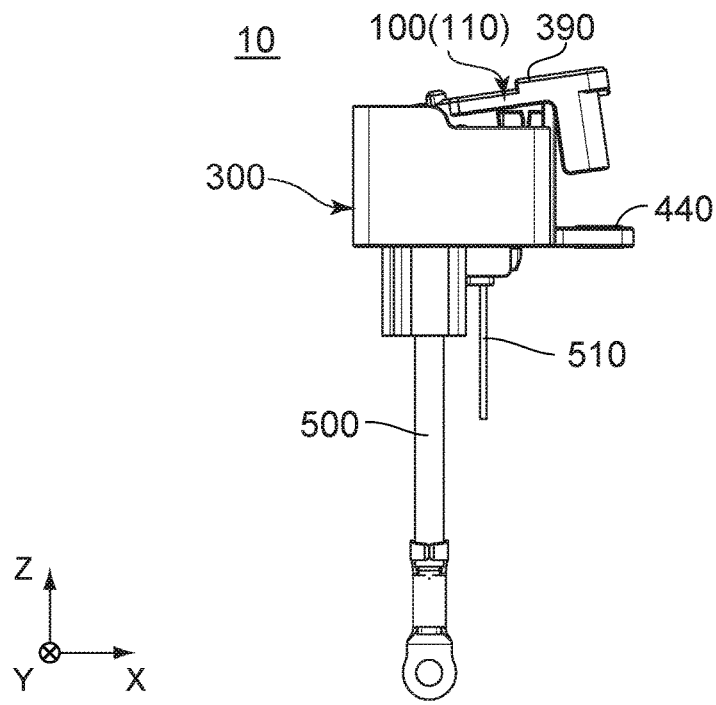
FIG. 29 is a side view showing the connector device of FIG. 28.

As shown in FIGS. 4, 20 and 28, the connector 100 is able to take on any of three states including a first state, a second state and a third state with respect to the mating connector 300. More specifically, as shown in FIGS. 4, 12, 20 and 28, the connector 100 is able to take on any of four states including the first state, the second state, the third state and a fourth state with respect to the mating connector 300. The first state is a state where the connector 100 is relatively located, as shown in FIGS. 20 to 27, with respect to the mating connector 300. The second state is a state where the connector 100 is relatively located, as shown in FIGS. 28 to 35, with respect to the mating connector 300. The third state is a state where the connector 100 is relatively located, as shown in FIGS. 4 to 11, with respect to the mating connector 300. The fourth state is a state where the connector 100 is relatively located, as shown in FIGS. 12 to 19, with respect to the mating connector 300. The second state is between the first state and the third state, more specifically between the first state and the fourth state. In addition, the fourth state is between the first state and the third state, more specifically between the second state and the third state.

Figure 2:
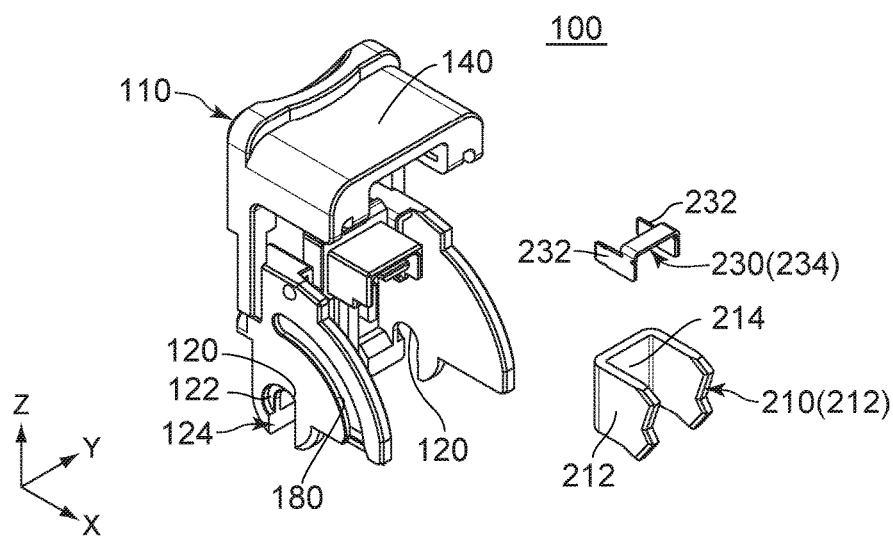
FIG. 2 is an exploded, perspective view showing the connector which is included in the connector device of FIG. 1.

As shown in FIG. 2, the connector 100 comprises a housing 110, a power-supply terminal 210 and a detection terminal 230.

Figure 7:
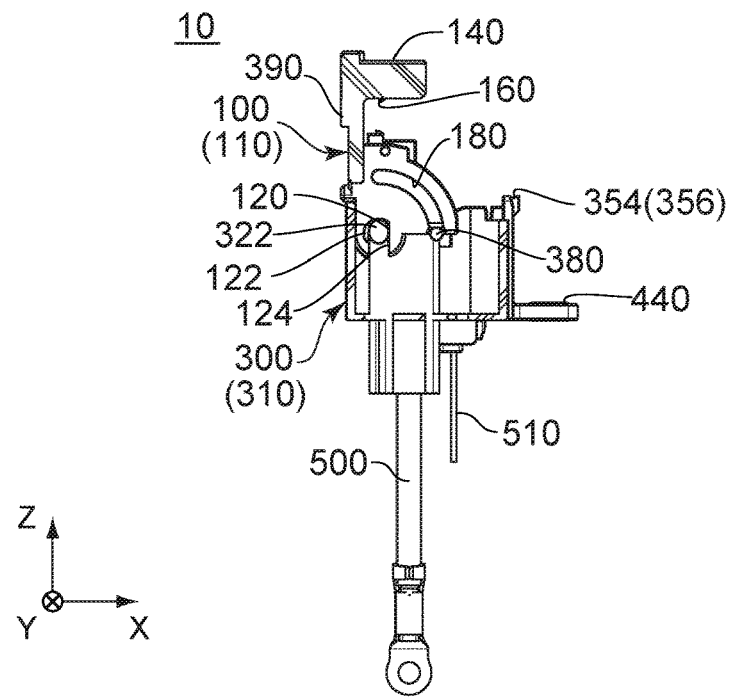
FIG. 7 is a cross-sectional view showing the connector device of FIG. 6, taken along line A-A.

Referring to FIGS. 2 and 7, the housing 110 is formed with two axis portions 120, two leading portions 124 and two guide portions 180. The axis portions 120 of the present embodiment are bearings. The axis portions 120 are located away from each other in the axis direction and arranged in symmetrical positions. Each of the axis portions 120 is formed with a flange guide portion 122. The flange guide portion 122 extends in the perpendicular plane. The leading portions 124 are provided to correspond to the axis portions 120, respectively. The leading portions 124 have shapes symmetrical to each other. As understood from FIGS. 1 and 7, the leading portions 124 are grooves for leading the rotation axes 320 to the axis portions 120, respectively. Each of the leading portions 124 extends in the radial direction of the specific cylindrical coordinates system. As shown in FIG. 2, each of the leading portions 124 of the present embodiment pierces the housing 110 in the axis direction. The guide portions 180 are grooves recessed in the axis direction and have shapes symmetrical to each other. Each of the guide portions 180 has an arc shape in the perpendicular plane. Although each of the guide portions 180 of the present embodiment is bottomed in the axis direction, each of the guide portions 180 may be bottomless. In other words, each of the guide portions 180 may pierce the housing 110 in the axis direction.

Referring to FIG. 8, the housing 110 is formed with two first regulated portions 132 and two lead portions 134. As shown in FIGS. 8 and 11, the housing 110 is formed with an opening 112. The first regulated portions 132 are visible through the opening 112. As understood from FIG. 26, when the connector 100 is in the first state, each of the first regulated portions 132 protrudes rearward. As shown in FIG. 26, each of the first regulated portions 132 has an upper surface. The upper surface of the first regulated portion 132 obliquely intersects with the up-down direction to be inclined forward and downward. As shown in FIG. 10, when the connector 100 is in the third state, each of the lead portions 134 is inclined rearward and downward.

As understood from FIGS. 2, 9, 10 and 11, the housing 110 of the present embodiment is formed with a base portion 140, a second release portion 150, two second regulated portions 160 and a fitting regulated portion 170, or an additional regulated portion 170. The second release portion 150 is operable in a second operating orientation. The second operating orientation is an orientation extending away from the rotation axis 320 in the radial direction around the rotation axis 320. In other words, the second operating orientation is the orientation extending away from the rotation axis 320 in the radial direction of the specific cylindrical coordinates system. More specifically, in the present embodiment, the second operating orientation coincides with the rearward direction when the connector 100 is in the first state. In other words, when the connector 100 is in the first state, the first operating orientation coincides with the second operating orientation. The second release portion 150 has two second spring portions 152 and a second operation portion 154. Each of the second spring portions 152 is resiliently deformable. The second operation portion 154 is supported by the second spring portions 152. The second spring portions 152 support the second regulated portions 160 and the fitting regulated portion 170.

Figure 22:
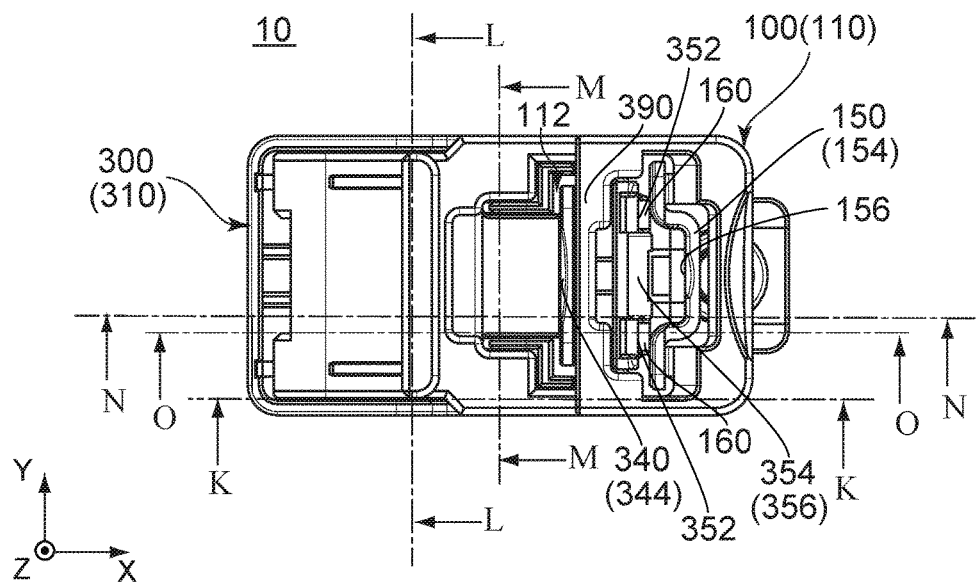
FIG. 22 is a top view showing the connector device of FIG. 20.
Figure 23:
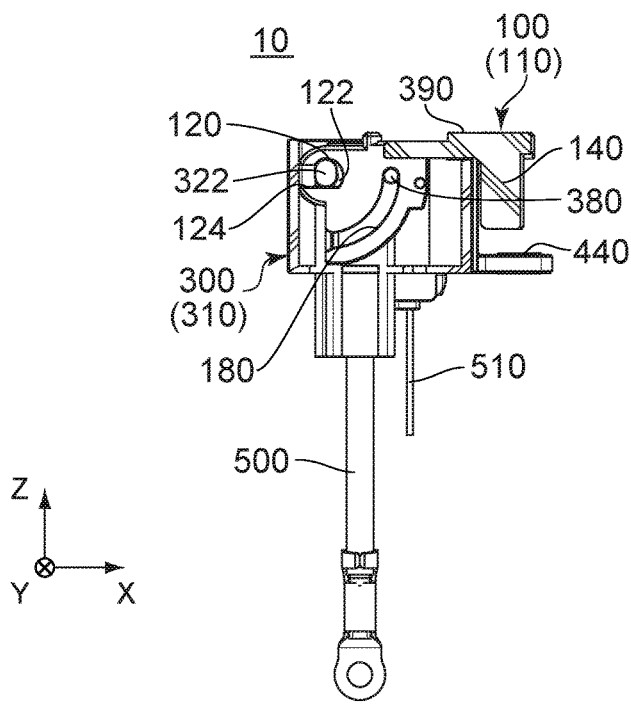
FIG. 23 is a cross-sectional view showing the connector device of FIG. 22, taken along line K-K.

As understood from FIGS. 9, 10, 11, 26 and 27, the second spring portions 152 have shapes symmetrical to each other. Each of the second spring portions 152 has an end portion and a cantilever structure extending in a third predetermined orientation from the base portion 140. In detail, when the connector 100 is in the first state, each of the second spring portions 152 protrudes forward from the base portion 140 and then extends upward. Moreover, each of the second spring portions 152 has a thickness in a second predetermined orientation. The second spring portions 152 are coupled with each other by the second operation portion 154. The second operation portion 154 couples the end portions of the second spring portions 152 with each other. When the connector 100 is in the first state, the fitting regulated portion 170 is located under the second operation portion 154 in the up-down direction. As shown in FIGS. 18 and 22, the second operation portion 154 is provided with a recess portion 156. The recess portion 156 is formed by a part of the second operation portion 154 being recessed in the second predetermined orientation. In other words, the recess portion 156 is recessed rearward when the connector 100 is in the first state. In the present embodiment, when the connector 100 is in the first state, the third predetermined orientation coincides with an upward direction.

Figure 9:
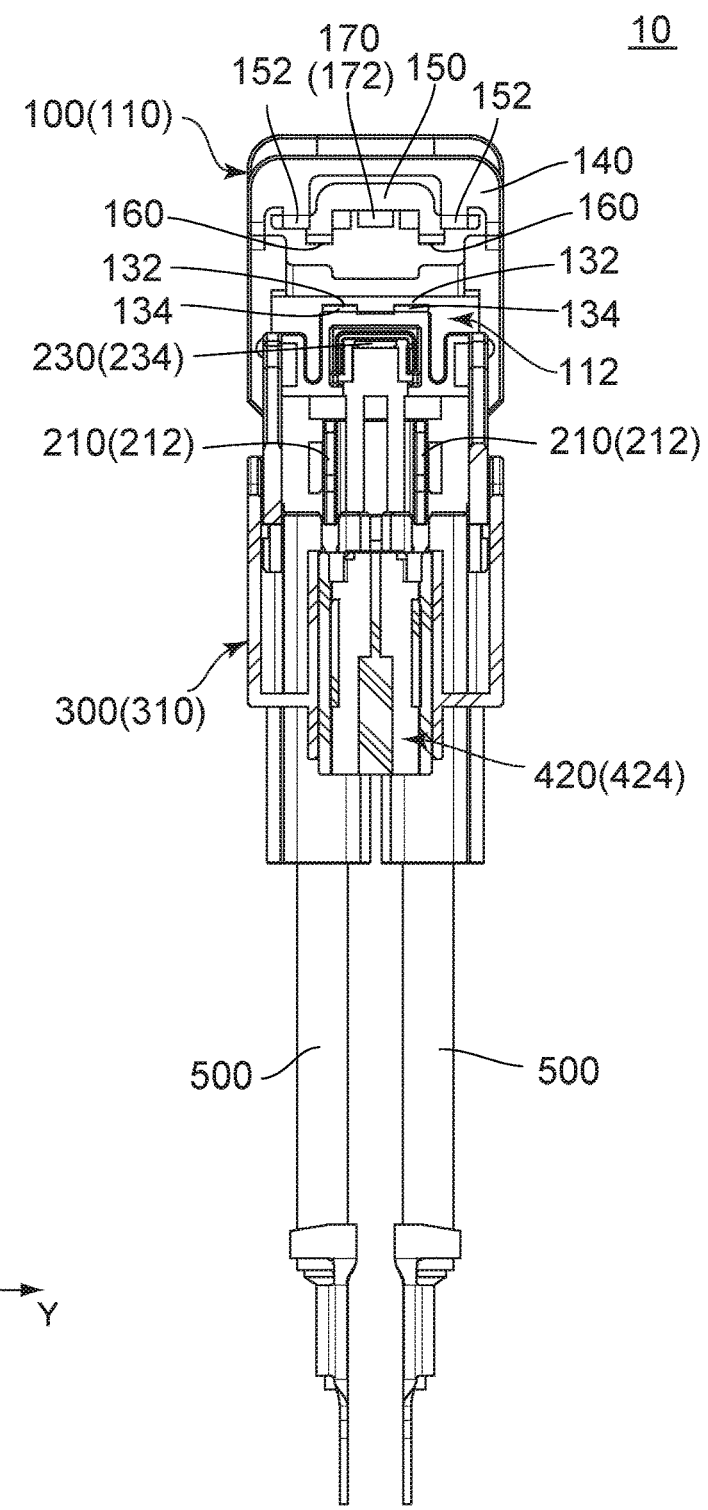
FIG. 9 is a cross-sectional view showing the connector device of FIG. 6, taken along line C-C.

As shown in FIG. 9, the fitting regulated portion 170 is located between the second spring portions 152 in the axis direction and supported by the second spring portions 152. Moreover, the fitting regulated portion 170 is located, as shown in FIG. 26, within the thickness of the second spring portion 152 in the second predetermined orientation. In other words, when the connector 100 is in the first state, the fitting regulated portion 170 is located within an extent of the second spring portion 152 in the front-rear direction. In the present embodiment, the whole of the fitting regulated portion 170 is located within the thickness of the second spring portion 152 in the second predetermined orientation. However, the present invention is not limited thereto. Only a part of the fitting regulated portion 170 may be located within the extent of the second spring portion 152 in the second predetermined orientation. In other words, the minimum requirement is that the fitting regulated portion 170 has a part thereof located within the thickness of the second spring portion 152 in the second predetermined orientation. The fitting regulated portion 170 is further provided with an abutment surface 172, or a first abutment surface 172, directed in a fourth predetermined orientation opposite to the third predetermined orientation or in a composite orientation of the second predetermined orientation and the four predetermined orientation. In other words, the abutment surface 172 has no component directed in a fifth predetermined direction opposite to the second predetermined orientation. In the present embodiment, the abutment surface 172 is directed in the fourth predetermined orientation. In the present embodiment, when the connector 100 is in the first state, the fourth predetermined orientation coincides with a downward direction while the fifth predetermined direction coincides with a forward direction.

As shown in FIGS. 9 and 26, the second regulated portions 160 have shapes symmetrical to each other. The second regulated portions 160 are located inward of the second spring portions 152, respectively, in the axis direction. Each of the second regulated portions 160 are supported by the second spring portion 152 corresponding thereto. In detail, each of the second regulated portions 160 protrudes forward from the second spring portion 152 corresponding thereto when the connector 100 is in the first state. As shown in FIG. 11, when the connector 100 is in the third state, the second regulated portion 160 protrudes downward beyond the fitting regulated portion 170.

As understood from FIGS. 11 and 18, operation of the second operation portion 154 causes the second spring portions 152 to be resiliently deformed, and therefore the second regulated portions 160 and the fitting regulated portion 170 can be moved at least in the radial direction of the specific cylindrical coordinates system. In other words, when the second spring portions 152 are resiliently deformed by operating the second operation portion 154, the second regulated portions 160 and the fitting regulated portion 170 can be moved at least in the second predetermined orientation. Thus, the second operation portion 154 can move not only the second regulated portions 160 but also the fitting regulated portion 170.

As shown in FIGS. 20 to 23, 26 and 27, the housing 110 is further provided with a prevention portion 390. The prevention portion 390 of the present embodiment is a beam which is provided so as to extend in the axis direction between the first operation portion 344 and the second operation portion 154 when the connector 100 is in the first state. In other words, the prevention portion 390 of the present embodiment is located between the first operation portion 344 and the second operation portion 154 in the front-rear direction when the connector 100 is in the first state. More specifically, when the connector 100 is in the first state, the prevention portion 390 of the present embodiment is located just rearward of the first operation portion 344 in the front-rear direction and is located forward of the second operation portion 154 in the front-rear direction. When the connector 100 is in the first state, an upper end of the prevention portion 390 of the present embodiment is located above an upper end of the first operation portion 344 in the up-down direction, and is located at a position similar to a position of an upper end of the second operation portion 154 in the up-down direction. When the connector 100 is in the first state, a front surface of the prevention portion 390 of the present embodiment intersects with the front-rear direction, and a lower end of the front surface of the prevention portion 390 is located above the upper end of the first operation portion 344 in the up-down direction.

Figure 16:
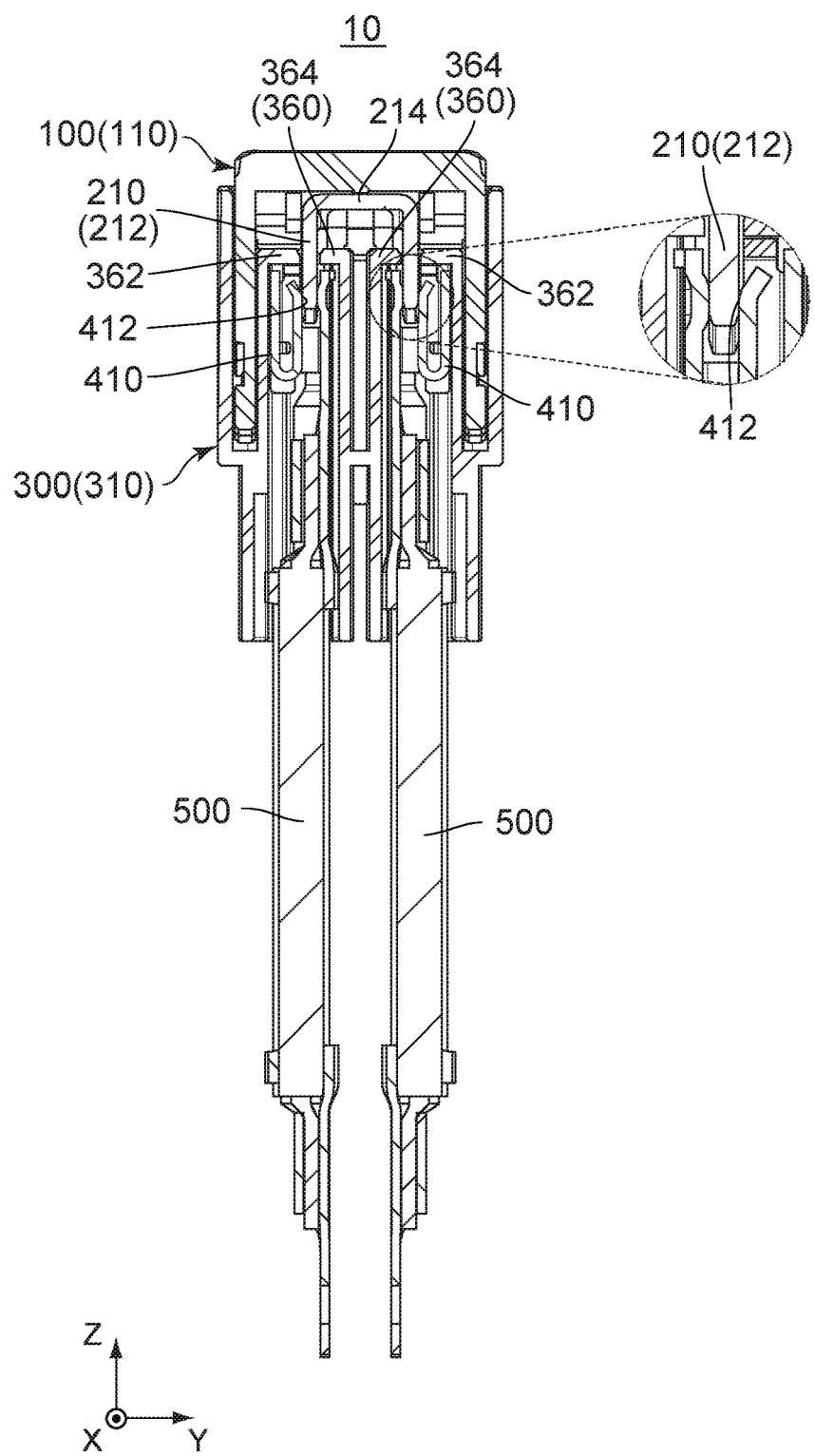
FIG. 16 is a cross-sectional view showing the connector device of FIG. 14, taken along line G-G, wherein a contact of a mating power-supply terminal and its surroundings are illustrated enlarged.
Figure 24:
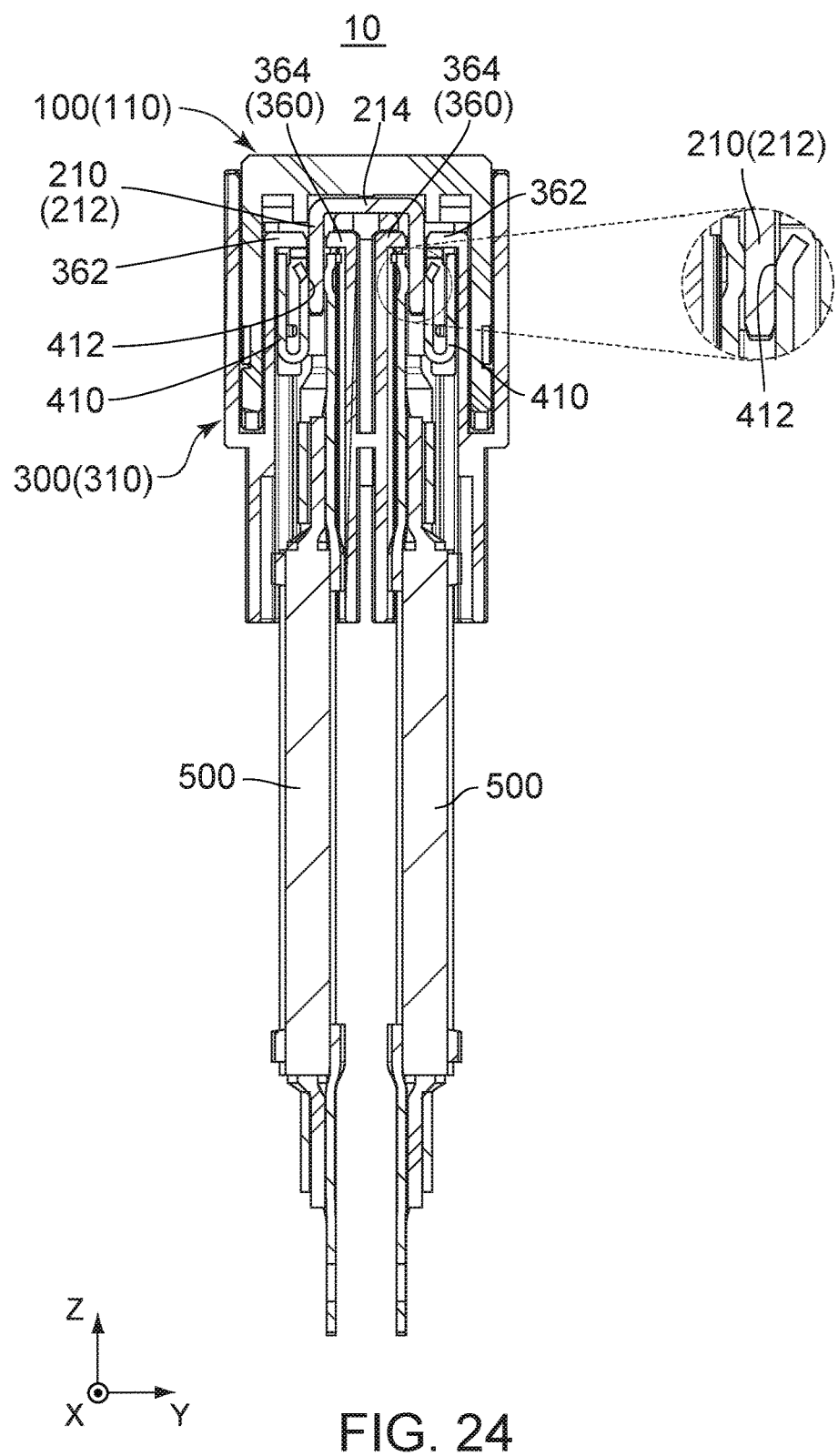
FIG. 24 is a cross-sectional view showing the connector device of FIG. 22, taken along line L-L, wherein the contact of the mating power-supply terminal and its surroundings are illustrated enlarged.
Figure 32:
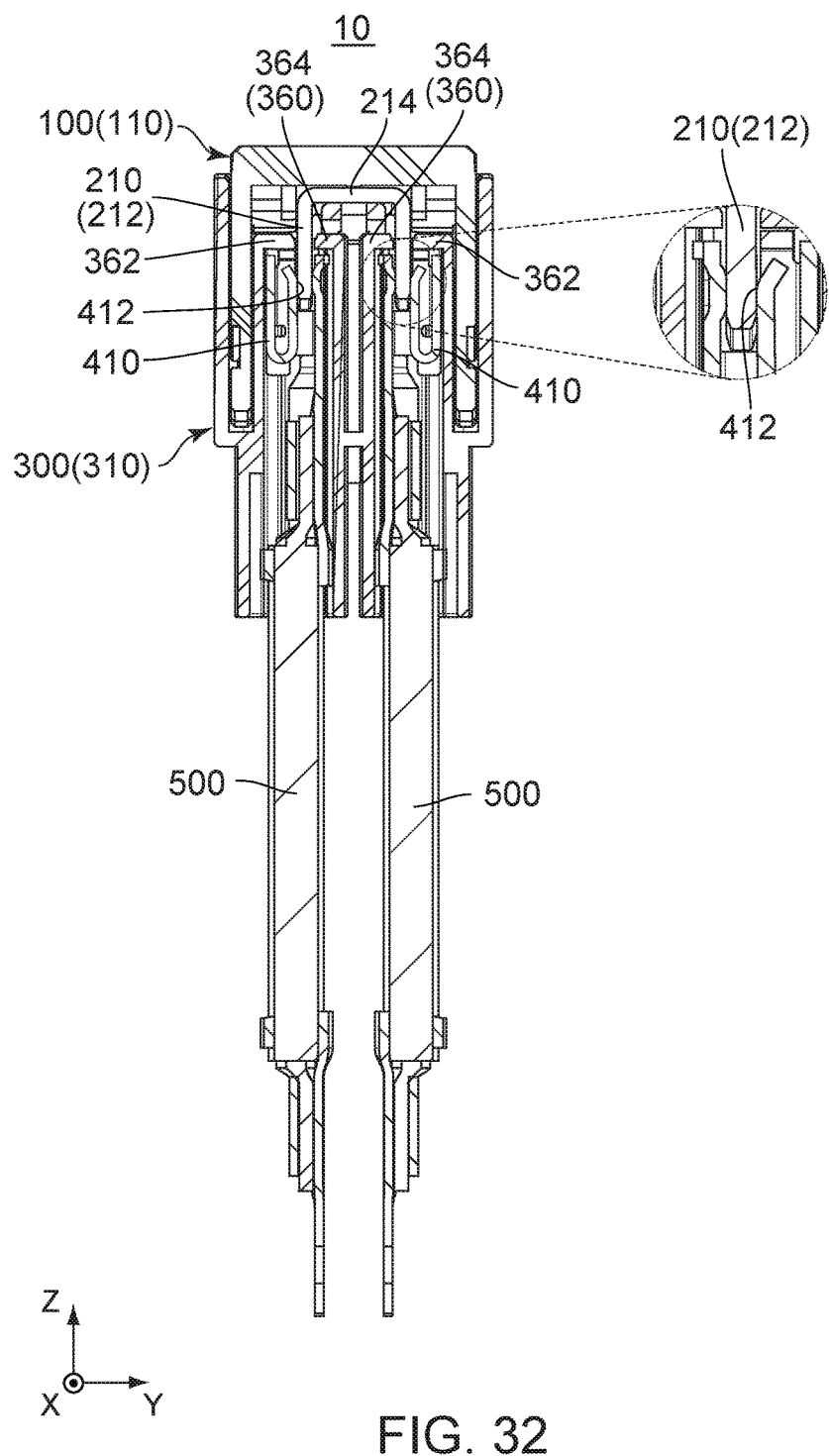
FIG. 32 is a cross-sectional view showing the connector device of FIG. 30, taken along line Q-Q, wherein the contact of the mating power-supply terminal and its surroundings are illustrated enlarged.

As shown in FIG. 2, the power-supply terminal 210 is provided with two blade portions 212 and a connection portion 214. The connection portion 214 couples the blade portions 212 with each other. As shown in FIGS. 16, 24 and 32, the power-supply terminal 210 is for connecting the mating power-supply terminals 410 to each other. As shown in FIG. 2, the blade portions 212 have shapes symmetrical to each other. Each of the blade portions 212 extends in the perpendicular plane. The blade portion 212 has a distal edge which is chamfered. As understood from FIG. 10, the connection portion 214 is attached to and held by the housing 110. Specifically, the power-supply terminal 210 of the present embodiment is fixed to the housing 110 so as to be relatively immovable with respect thereto.

As shown in FIG. 2, the detection terminal 230 is provided with two contact portions 232 and a connection portion 234. The connection portion 234 couples the contact portions 232 with each other. As understood from FIGS. 2, 4, 8 and 9, the detection terminal 230 is held by the housing 110. Unlike the detection terminals of Patent Document 1, the detection terminal 230 of the present embodiment is fixed to the housing 110 so as to be relatively immovable with respect thereto.

As understood from FIG. 1, a distance between each of the axis portions 120 and the power-supply terminal 210 is shorter than a distance between each of the axis portions 120 and the detection terminal 230. Consequently, connection of the power-supply terminal 210 to the mating connector 300 can be performed prior to connection of the detection terminal 230 to the mating connector 300 without enlarging the size of the whole of the connector device 10.

As understood from FIGS. 1, 4, 12, 20 and 28, when the axis portions 120 and the mating axis portions 320 are combined with one another, the connector 100 becomes rotatable around the rotation axes 320, or the mating axis portions 320, while taking on a state between the first state and the third state with respective to the mating connector 300. As described above, the first state is the state shown in FIG. 20. Specifically, when the connector 100 is in the first state, the connector 100 is in a lying state. The third state is the state shown in FIG. 4. Specifically, when the connector 100 is in the third state, the connector 100 is in a standing state. As understood from FIGS. 4, 12, 20 and 28, when the connector 100 is in a state between the first state and the third state, the connector 100 is located above the mating connector 300 in the up-down direction. Referring to FIGS. 7 and 8, the rotation axes 320 and the first regulated portions 132 define a first distance therebetween while the rotation axes 320 and the second regulated portions 160 define a second distance therebetween. As understood from FIGS. 7 and 8, the first distance is shorter than the second distance.

The flange guide portions 122 correspond to the flanges 322, respectively. As understood from FIGS. 2, 7, 15, 23 and 31, when the connector 100 is turned while taking on a state between the first state and the third state, each of the flange guide portions 122 is located inward of the flange 322 corresponding thereto in the axis direction and faces the flange 322 corresponding thereto to guide movement of the flange 322 corresponding thereto in the perpendicular plane. The mating guide portions 380 correspond to the guide portions 180, respectively. When the connector 100 is turned, each of the protrusions of the mating guide portions 380 is moved in the groove of the guide portion 180 corresponding thereto to guide the turn of the connector 100.

As understood from FIGS. 1 and 4 to 7, the connector 100 in the standing state, or in the state that a longitudinal direction thereof coincides with the up-down direction, is attached to the mating connector 300 from above of the mating connector 300 along the up-down direction. In this time, each of the leading portions 124 receives the mating axis portion 320 corresponding thereto and guides the mating axis portion 320 corresponding thereto to the axis portion 120 corresponding thereto along the up-down direction. For that purpose, as shown in FIG. 7, when the connector 100 is in the third state, the leading portion 124 extends along the up-down direction and opens downward. As shown in FIG. 8, when the connector 100 is in the third state, the power-supply terminal 210 is not connected to the mating power-supply terminals 410. In addition, as understood from FIGS. 7 and 9, the detection terminal 230 is not connected to the mating detection terminals 430.

As shown in FIG. 18, when the connector 100 is turned so as to transition from the third state to the fourth state, the fitting regulated portion 170 is brought into abutment with the fitting regulating portion 354 at a position located within the thickness of the second spring portion 152 in the second predetermined orientation. In other words, the part of the fitting regulated portion 170 located within the thickness of the second spring portion 152 in the second predetermined orientation is brought into abutment with the fitting regulating portion 354. As a result, the connector 100 is once regulated so as not to transition toward the first state through the fourth state. At this time, the abutment surface 172 of the fitting regulated portion 170 faces the abutment surface 356 of the fitting regulating portion 354. As mentioned before, the abutment surface 172 of the fitting regulated portion 170 is directed in the fourth predetermined orientation or in the composite orientation of the second predetermined orientation and the fourth predetermined orientation. On the other hand, when the connector 100 is in the fourth state, the abutment surface 356 of the fitting regulating portion 354 is directed in a composite orientation of the third predetermined orientation and the fifth predetermined direction. In other words, the abutment surface 356 has no component directed in the second predetermined orientation. In addition, the fitting regulated portion 170 is located within the thickness of the second spring portion 152 in the second predetermined orientation. Accordingly, when the connector 100 is tried to be forcibly turned so as to transition toward the first state, the second spring portions 152 are never resiliently deformed in a direction that the fitting regulated portion 170 is slid to release regulation by the fitting regulating portion 354 for the fitting regulated portion 170. Therefore, the connector 100 is maintained in the fourth state until an operation is performed to release the regulation by the fitting regulating portion 354 for the fitting regulated portion 170.

As shown in FIGS. 16 and 17, when the connector 100 is in the fourth state, the power-supply terminal 210 is connected to the mating power-supply terminals 410 while the detection terminal 230 does not reach the mating detection terminals 430. In other words, as shown in FIGS. 12 to 17, when the connector 100 is in the fourth state, the power-supply terminal 210 is connected to the mating power-supply terminals 410 while the detection terminal 230 is not connected to the mating detection terminals 430. Since the detection terminal 230 is not connected to the mating detection terminals 430, the signal lines 510 are disconnected from each other. Consequently, the power-supply system (not shown) can detect incomplete mating of the connector 100 with the mating connector 300 and supply no current to the power cables 500 even when the power-supply terminal 210 physically connects the mating power-supply terminals 410 to each other.

As understood from FIGS. 2 and 8, each of the blade portions 212 of the power-supply terminal 210 is moved in the perpendicular plane while the connector 100 is turned. Referring to FIGS. 7 and 8, since each of the flange guide portions 122 guides the flange 322 corresponding thereto, the blade portions 212 can be moved appropriately in the perpendicular planes and reach into the mating power-supply terminals 410, respectively.

The edges of the blade portions 212 are chamfered. Therefore, each of the blade portions 212 is smoothly received in the mating power-supply terminal 410 corresponding thereto when each of the blade portions 212 is connected to the mating power-supply terminal 410 corresponding thereto. In the present embodiment, each of the blade portions 212 of the power-supply terminal 210 is in contact with the contact 412 of the mating power-supply terminal 410 corresponding thereto in the axis direction in the mating power-supply terminal 410 corresponding thereto.

As understood from FIG. 18, when the connector 100 is in the fourth state, the lead portions 134 push a front surface of the first release portion 340 and deform the first spring portion 342 resiliently. When the first spring portion 342 is resiliently deformed, each of the first regulating portions 332 is moved at least rearward in comparison with when the connector 100 is in the third state. At this time, the upper surfaces of the first regulated portions 132 are located above the lower surfaces of the first regulating portions 332, respectively, in the up-down direction. That is, each of the first regulated portions 132 is not regulated by the first regulating portion 332 corresponding thereto.

As shown in FIG. 19, when the connector 100 is in the fourth state, upper surfaces of the second regulated portions 160 are located above the second regulating portions 352, respectively, in the up-down direction. That is, each of the second regulated portions 160 is not regulated by the second regulating portion 352 corresponding thereto.

As described above with referring to FIG. 18, when the connector 100 is in the fourth state, the fitting regulated portion 170 is brought into abutment with the fitting regulating portion 354, so that turning or movement of the connector 100 is temporarily regulated. This regulation is hereinafter referred to as "additional regulation". As understood from FIG. 18, when the connector 100 is in the fourth state, operating the second operation portion 154 releases the regulation by the fitting regulating portion 354 for the fitting regulated portion 170. In detail, when the second operation portion 154 is moved in an orientation extending away from the rotation axis 320 in the radial direction of the specific cylindrical coordinates system, the second spring portions 152 are resiliently deformed, so that the fitting regulated portion 170 is moved in an orientation extending away from the rotation axis 320 in the radial direction of the specific cylindrical coordinates system. As a result, the aforementioned additional regulation is released, and the connector 100 is transitionable to the first state shown in FIG. 20. Thus, the second release portion 150 also serves as an additional release portion to release the regulation by the fitting regulating portion 354 for the fitting regulated portion 170. That is, the second operation portion 154 serves as an additional operation portion while the second spring portions 152 serve as a cantilever portion. In other words, the additional operation portion and the cantilever portion form the second release portion 150.

As shown in FIGS. 20 to 25, when the connector 100 is in the first state, the power-supply terminal 210 of the connector 100 is connected to the mating power-supply terminals 410 while the detection terminal 230 of the connector 100 is connected to the mating detection terminals 430. Accordingly, the power-supply system (not shown) can detect complete mating of the connector 100 with the mating connector 300 and supply current to the power cables 500.

In the present embodiment, the power-supply terminal 210 maintains to be connected with the mating power-supply terminals 410 when the connector 100 is in a state between the first sate and the fourth state. As shown in FIG. 24, when the connector 100 is in the first state, the power-supply terminal 210 has a cross-sectional shape of an angular inverted U-shape in a YZ-plane, or in a plane perpendicular to the front-rear direction.

On the other hand, as understood from FIGS. 17 and 25, the detection terminal 230 is not connected to the mating detection terminals 430 until the connector 100 transitions to the first state. When the connector 100 transitions to the first state, the detection terminal 230 is connected to the contacts 432 of the mating detection terminals 430. Additionally, as shown in FIG. 25, when the connector 100 is in the first state, the detection terminal 230 has a cross-sectional shape of an angular U-shape in the YZ-plane, or in the plane perpendicular to the front-rear direction.

As understood from FIGS. 18 and 26, while the connector 100 transitions from the fourth state to the first state, each of the first regulated portions 132 rides over the first regulating portion 332 corresponding thereto and is moved below the first regulating portion 332 corresponding thereto in the up-down direction. As shown in FIG. 26, when the connector 100 is in the first state, each of the first regulated portions 132 is located below the first regulating portion 332 corresponding thereto in the up-down direction. As understood from FIG. 26, each of the first regulated portions 132 overlaps with the first regulating portion 332 corresponding thereto when viewed along the up-down direction. With this structure, when the connector 100 is tried to transition from the first state to the second state, each of the first regulated portions 132 is brought into abutment with the first regulating portion 332 corresponding thereto and regulated to prevent the connector 100 from transitioning to the second state. It should be noted that there is a clearance between the first regulating portion 332 and the first regulated portion 132 corresponding thereto in FIG. 26. The first regulating portion 332 and the first regulated portion 132 corresponding thereto may, however, be in contact with each other when the connector 100 is in the first state. In that case, the connector 100 cannot be turned to transition toward the second state through the first state. As a result, looseness of the connector 100 relative to the mating connector 300 is prevented.

As understood from FIGS. 19 and 27, while the connector 100 transitions from the fourth state to the first state, each of the second regulated portions 160 rides over the second regulating portion 352 corresponding thereto by using resilient deformation of the second spring portions 152 and is moved below the second regulating portion 352 corresponding thereto in the up-down direction. As shown in FIG. 27, when the connector 100 is in the first state, each of the second regulated portions 160 overlaps with the second regulating portion 352 corresponding thereto when viewed along the up-down direction. With this structure, when the connector 100 is tried to transition from the second state to the third state, each of the second regulated portions 160 is brought into abutment with the second regulating portion 352 corresponding thereto and regulated to prevent the connector 100 from transitioning to the third state. The regulation by the second regulating portions 352 for the second regulated portions 160 regulates the transition of the connector 100 to the third state through the second state.

As understood from FIGS. 22 and 26, though the first operation portion 344 protrudes upward from the opening 112 of the housing 110, the first operation portion 344 is located below the upper end of the prevention portion 390 of the housing 110 in the up-down direction. Accordingly, the first operation portion 344 can be operated intentionally and can be prevented from being operated by accident.

As shown in FIGS. 26 and 27, when the connector 100 is in the first state, each of the second spring portions 152 extends upward from the base portion 140 while the second operation portion 154 is located at an upper end of each of the second spring portions 152. As understood from FIGS. 22, 26 and 27, the second operation portion 154 is practically hidden by the fitting regulating portion 354 when viewed from the front along the front-rear direction. Accordingly, the second operation portion 154 is difficult to be operated when the connector 100 is in the first state.

As understood from FIG. 26, in order that the connector 100 transitions from the first state to the third state, at first, the first release portion 340 is operated to release the regulation by the first regulating portions 332 for the first regulated portions 132. Specifically, when the first release portion 340 is operated along an operating direction, the regulation by the first regulating portions 332 for the first regulated portions 132 is released. In the present embodiment, the operating direction is the X-direction. In other words, in the present embodiment, the operating direction coincides with the front-rear direction. In addition, since the first operating orientation coincides with the rearward direction, the operating direction includes the first operating orientation. Since the second operating orientation coincides with the rearward direction when the connector 100 is in the first state, the operating direction includes the second operating orientation when the connector 100 is in the first state. In detail, the first operation portion 344 is moved in the orientation extending away from the rotation axis 320 in the radial direction of the specific cylindrical coordinates system to deform the first spring portion 342 resiliently. Then, the regulation by the first regulating portions 332 for the first regulated portions 132 is released. Specifically, when the first operation portion 344 is moved rearward, the first spring portion 342 is resiliently deformed so that each of the first regulating portions 332 is moved at least rearward. Accordingly, the regulation by the first regulating portions 332 for the first regulated portions 132 is released. In a state where the regulation by the first regulating portions 332 for the first regulated portions 132 is released, the connector 100 can transition from the first state toward the third state.

As shown in FIGS. 22 and 26, when the connector 100 is in the first state, the prevention portion 390 is located between the first release portion 340 and the second release portion 150 in the operating direction and prevents the second release portion 150 from being subsequently operated upon operation of the first release portion 340 along the operating direction. More specifically, when an operator hooks his/her finger on the first operation portion 344 of the first release portion 340 to operate the first release portion 340 along the operating direction under a state where the connector 100 is in the first state, the finger of the operator abuts against the prevention portion 390 to be stopped in its movement before abutting against the second operation portion 154 of the second release portion 150. Accordingly, the second release portion 150 is prevented from being subsequently operated upon the operation of the first release portion 340.

Although the prevention portion 390 of the present embodiment is the beam which is provided so as to extend in the axis direction between the first operation portion 344 and the second operation portion 154 when the connector 100 is in the first state, the present invention is not limited thereto. The prevention portion 390 may be a beam which is provided so as to intersect with the operating direction between the first operation portion 344 and the second operation portion 154 when the connector 100 is in the first state. Also in that case, when an operator hooks his/her finger on the first operation portion 344 of the first release portion 340 to operate the first release portion 340 along the operating direction under the state where the connector 100 is in the first state, the finger of the operator abuts against the prevention portion 390 to be stopped in its movement before abutting against the second operation portion 154 of the second release portion 150. Accordingly, the second release portion 150 is prevented from being subsequently operated upon the operation of the first release portion 340.

As understood from FIGS. 26, 27, 34 and 35, when the connector 100 is turned in order to transition toward the third state after the regulation by the first regulating portions 332 for the first regulated portions 132 is released, each of the second regulated portions 160 is brought into abutment with the second regulating portion 352 corresponding thereto in the second state. Hence, the connector 100 is regulated so as not to transition toward the third state through the second state. As understood from FIG. 35, at this time, the second regulated portions 160 are located upward of fixed ends of the second spring portions 152. The fixed ends are boarder parts between the second spring portions 152 and the base portion 140. Furthermore, the second regulated portions 160 are located inward of the fixed ends of the second spring portions 152 in the radial direction of the specific cylindrical coordinates system. Therefore, when the connector 100 is tried to be forcibly turned in order to transition toward the third state, the second spring portions 152 are resiliently deformed to move the second regulated portions 160 in an orientation extending to the rotation axis 320 in the radial direction of the specific cylindrical coordinates system. As a result, each of the second regulated portions 160 is strongly caught by the second regulating portion 352 corresponding thereto. Then, it is possible to avoid accidental release of the regulation by the second regulating portions 352 for the second regulated portions 160.

Figure 34:
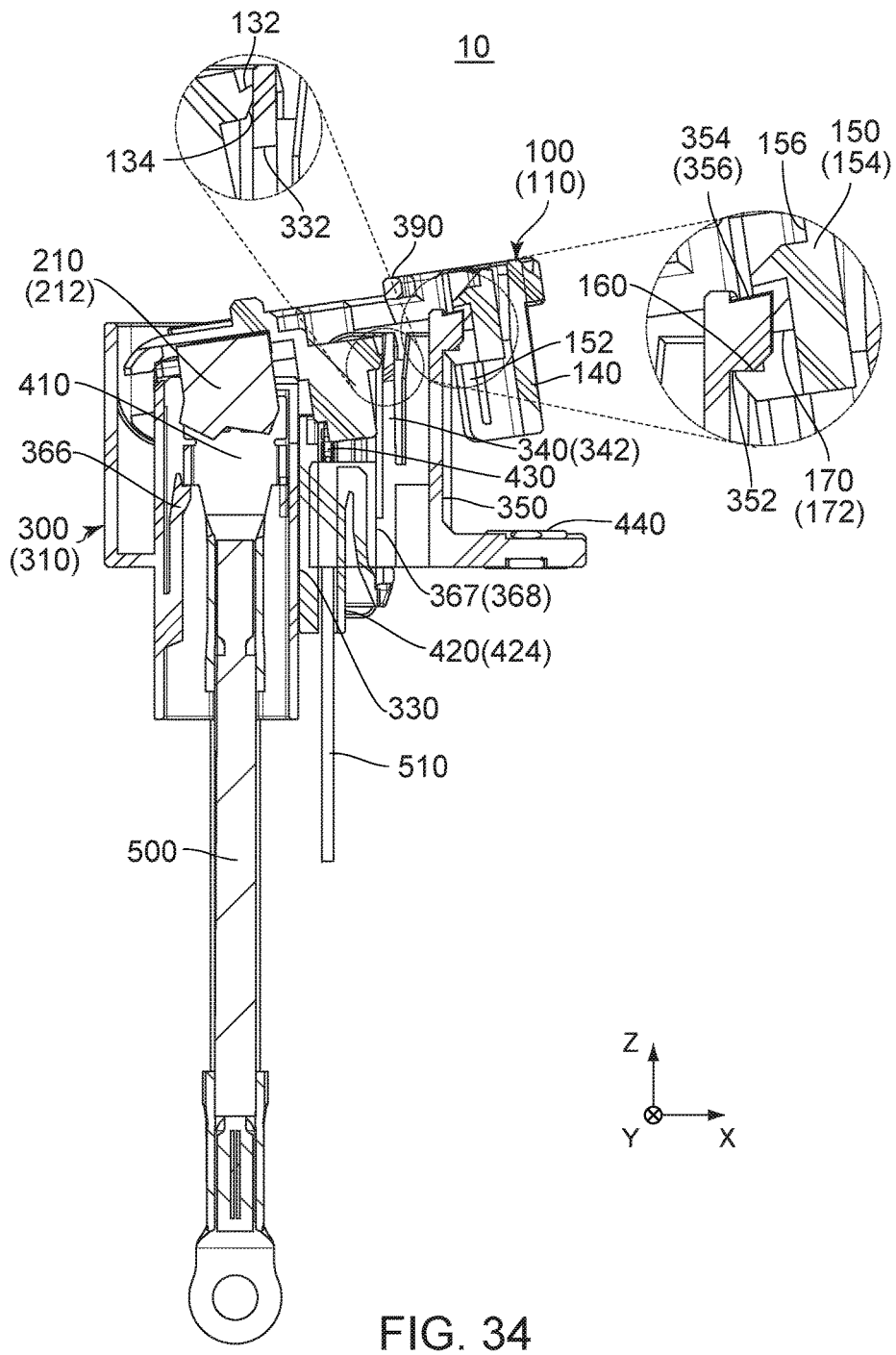
FIG. 34 is a cross-sectional view showing the connector device of FIG. 30, taken along line S-S, wherein the first regulating portion and its surroundings are illustrated enlarged while the second regulating portion and its surroundings are illustrated enlarged.

As understood from FIGS. 27 and 34, when the connector 100 is turned in order to transition from the first state to the second state, the second operation portion 154 is moved toward the fitting regulating portion 354. In this event, if the fitting regulating portion 354 comes into contact with the second operation portion 154, the second spring portions 152 receive a force directed in an orientation extending away from the rotation axis 320 in the radial direction of the specific cylindrical coordinates system. The force works to deform the second spring portions 152 resiliently in a direction that the regulation by the second regulating portions 352 for the second regulated portions 160 is released. As understood from FIG. 34, the recess portion 156 of the second operation portion 154 accommodates at least a part of the fitting regulating portion 354 when the connector 100 is in the second state. With this, the recess portion 156 prevents the fitting regulating portion 354 and the second operation portion 154 from coming into contact with each other and prevents the second spring portions 152 from being resiliently deformed.

As understood from FIG. 33, while the connector 100 transitions from the first state to the second state, the detection terminal 230 is disconnected from the mating detection terminals 430. On the other hand, as shown in FIG. 32, the power-supply terminal 210 remains to be connected to the mating power-supply terminals 410. Specifically, when the connector 100 is in the second state, the power-supply terminal 210 is connected to the mating power-supply terminals 410 while the detection terminal 230 is disconnected from the mating detection terminals 430. Since the detection terminal 230 is disconnected from the mating detection terminals 430, the power-supply system (not shown) can control to stop current supply to the power cables 500.

Figure 30:
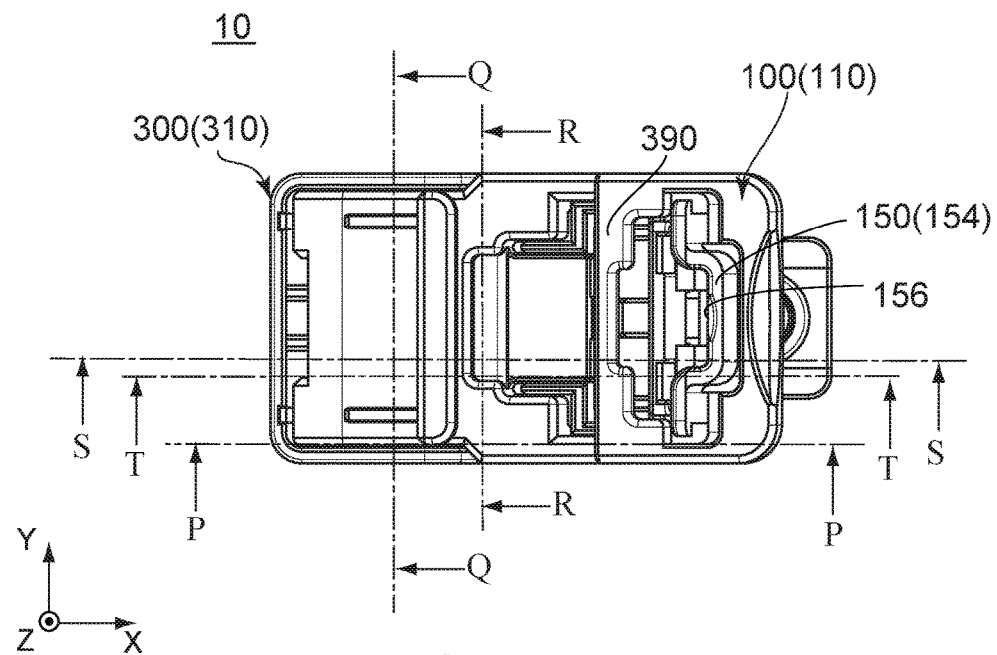
FIG. 30 is a top view showing the connector device of FIG. 28.
Figure 31:
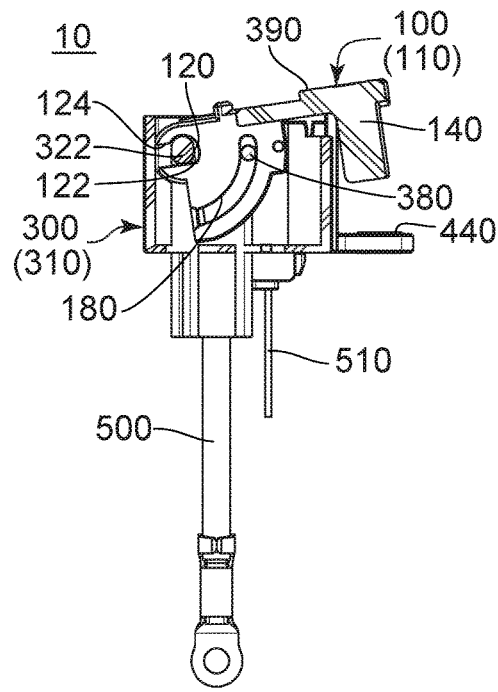
FIG. 31 is a cross-sectional view showing the connector device of FIG. 30, taken along line P-P.
Figure 35:
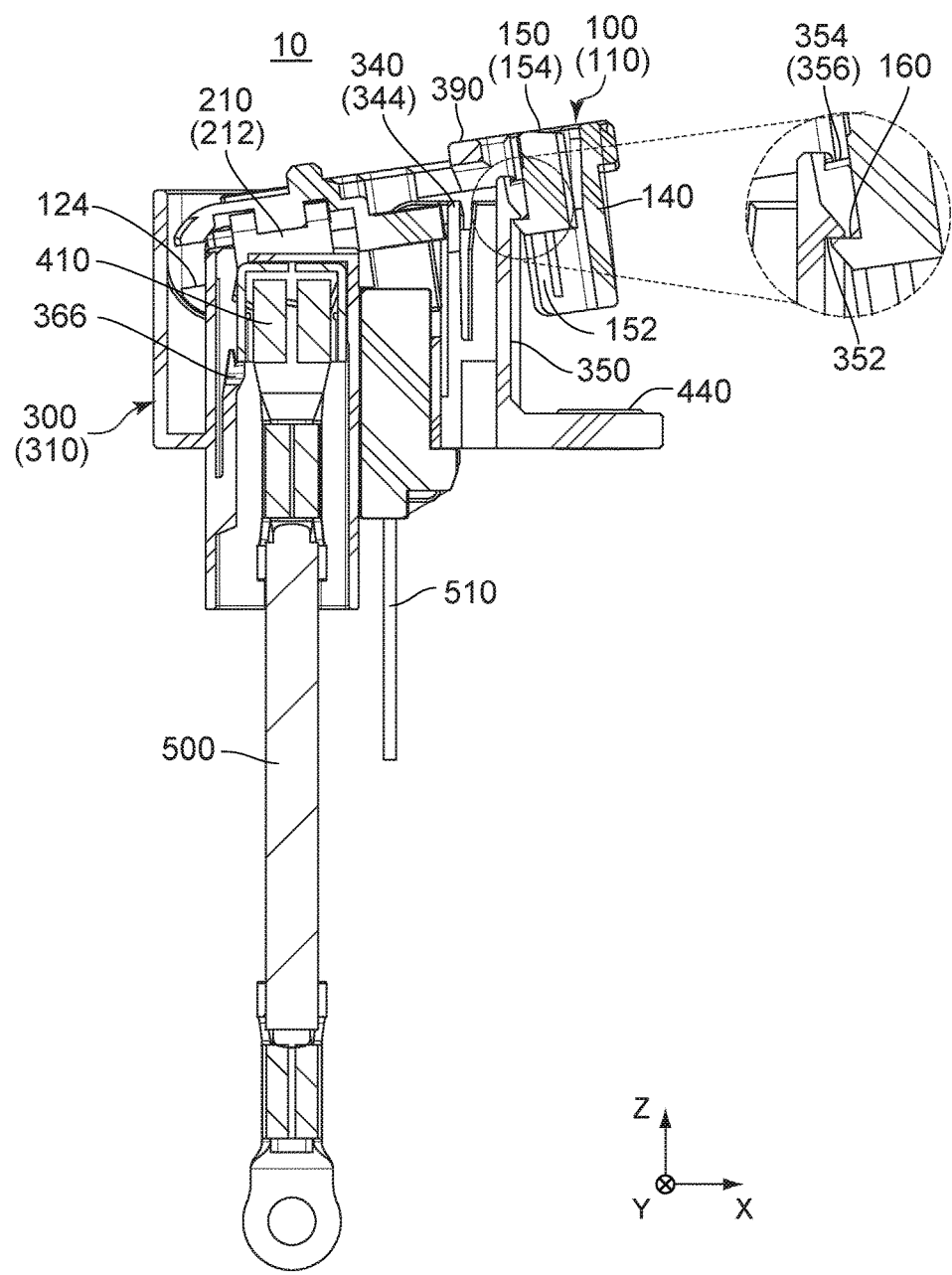
FIG. 35 is a cross-sectional view showing the connector device of FIG. 30, taken along line T-T, wherein the second regulating portion and its surroundings are illustrated enlarged.
Figure 36:
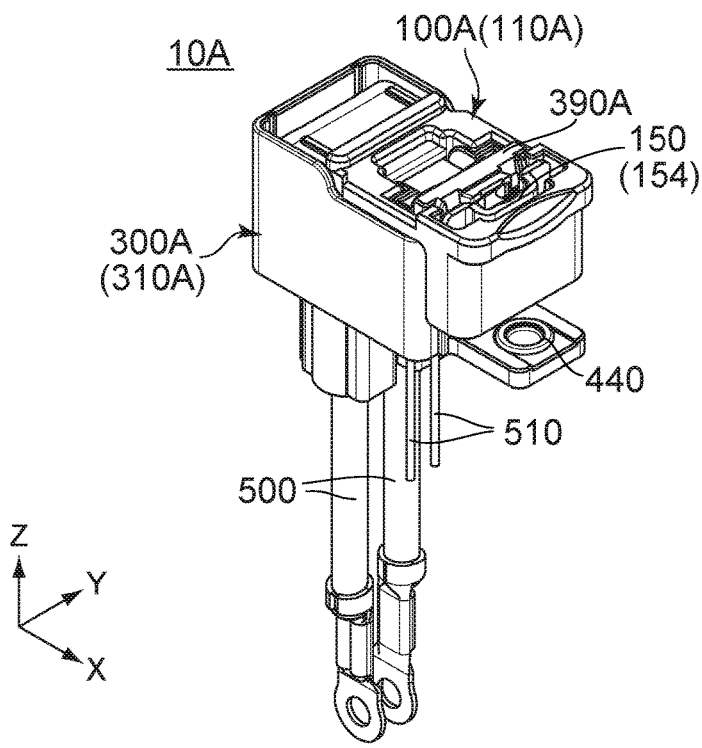
FIG. 36 is a perspective view showing a connector device according to a second embodiment of the present invention, wherein a connector is in a first state.
Figure 37:
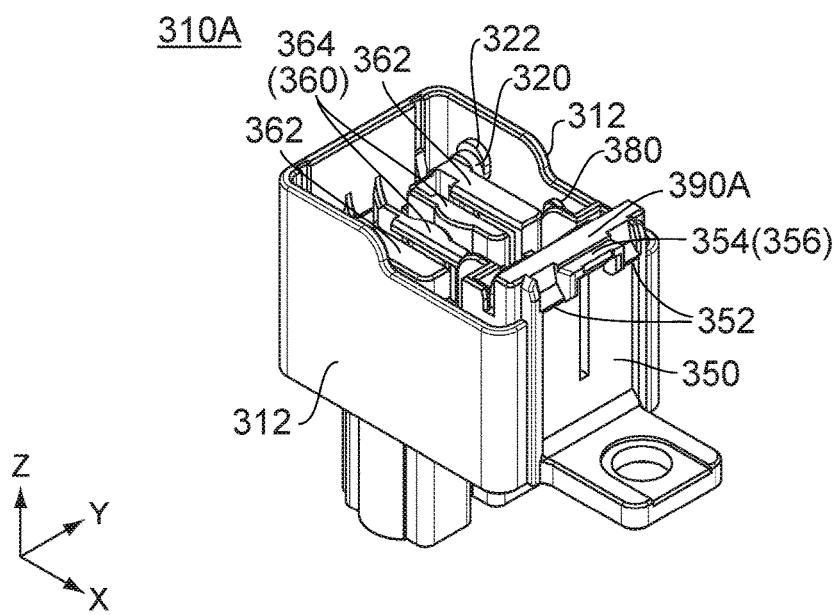
FIG. 37 is a perspective view showing a mating housing which is included in the connector device of FIG. 36.
Figure 38:
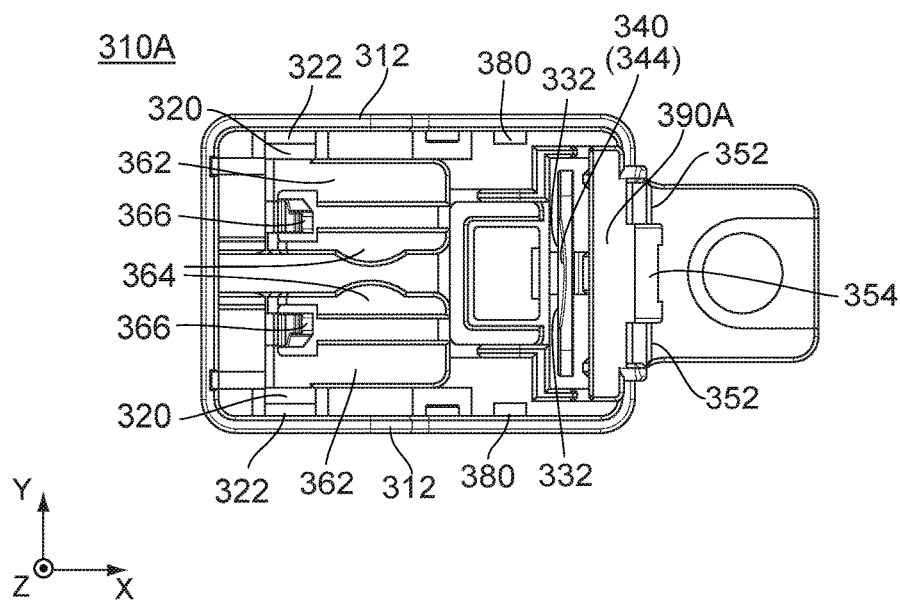
FIG. 38 is a top view showing the mating housing of FIG. 37.
Figure 39:
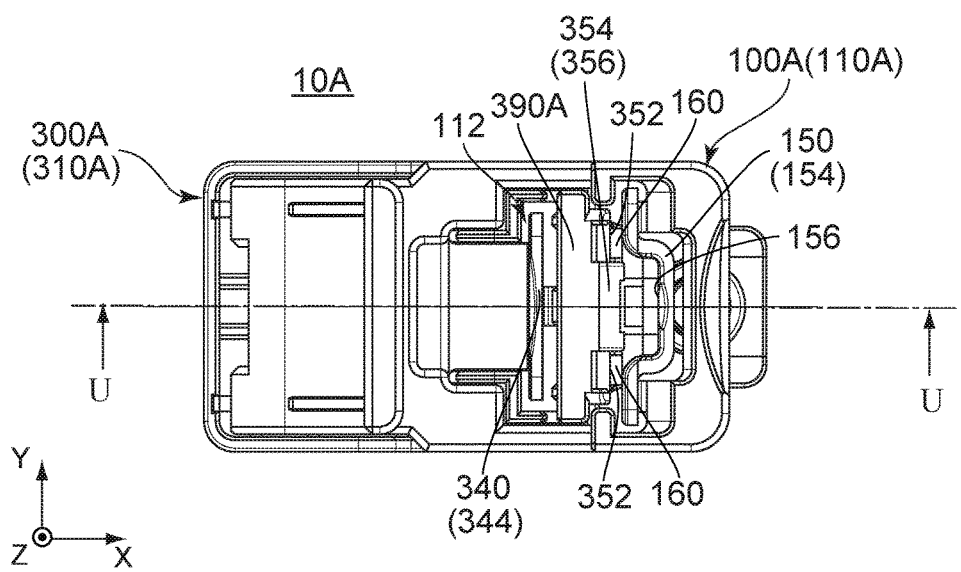
FIG. 39 is a top view showing the connector device of FIG. 36.
Figure 40:
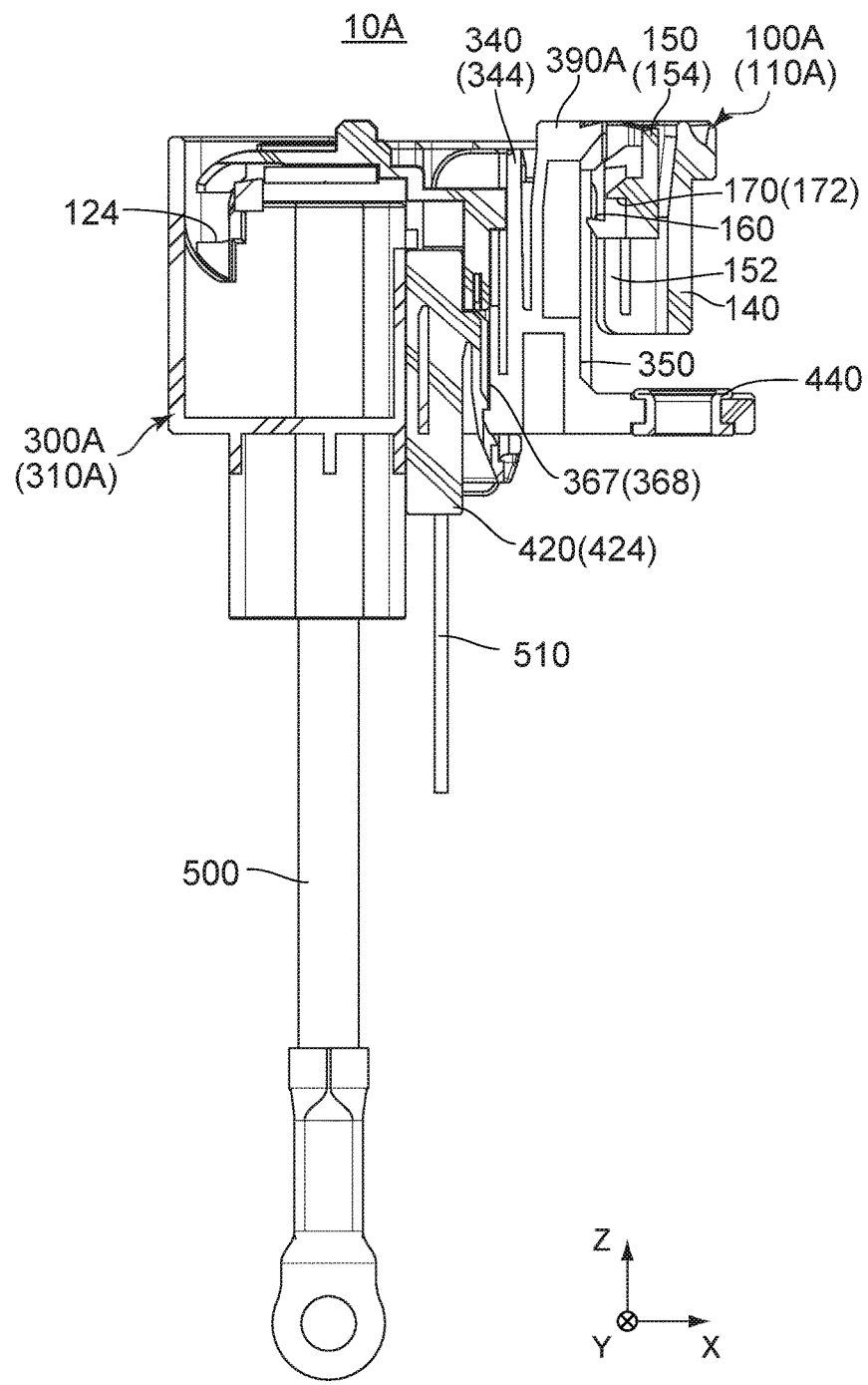
FIG. 40 is a cross-sectional view showing the connector device of FIG. 39, taken along line U-U.
Figure 41A:
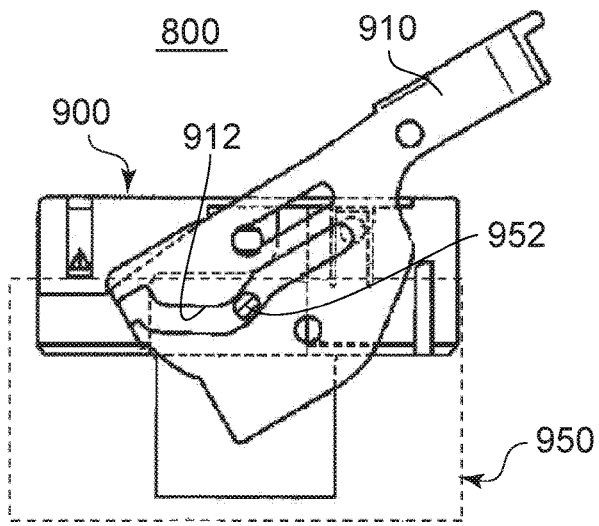
FIG. 41A is a side view showing a lever fitting type power source circuit interruption device, or a connector device, of Patent Document 1. In the drawing, a connector is depicted by a solid line while a mating connector is depicted by a broken line.
Figure 41B:
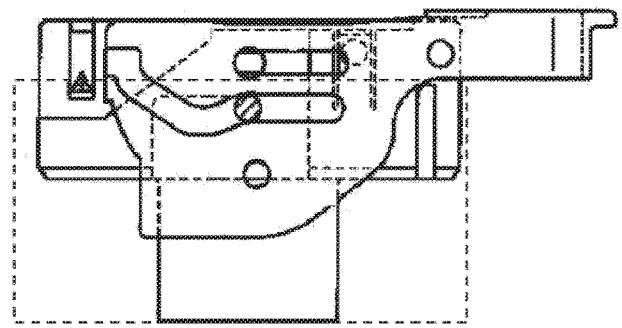
FIG. 41B is another side view showing the lever fitting type power source circuit interruption device of FIG. 41A.
Figure 41C:
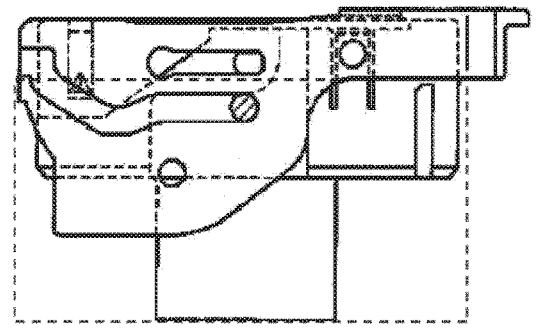
FIG. 41C is yet another side view showing the lever fitting type power source circuit interruption device of FIG. 41A.

As understood from FIGS. 30, 34 and 35, when the connector 100 is turned in order to transition from the first state to the second state, the second operation portion 154 becomes located above the fitting regulating portion 354 in the up-down direction. Specifically, when the second operation portion 154 is viewed from the front along the front-rear direction, a visible area of the second operation portion 154 is increased as the connector 100 transitions from the first state to the second state. In other words, an operable portion of the second release portion 150 is larger when the connector 100 is in the second state in comparison with the first state. In detail, the operable portion has a first extent when the connector 100 is in the first state. The operable portion has a second extent when the connector 100 is in the second state. The second extent is larger than the first extent. Consequently, the second operation portion 154 is easy to be operated when the connector 100 is in the second state in comparison with the first state.

As understood from FIG. 35, in order that the connector 100 transitions from the second state to the third state, the second release portion 150 is operated to release the regulation by the second regulating portions 352 for the second regulated portions 160. In detail, the second operation portion 154 is moved in the orientation extending away from the rotation axis 320 in the radial direction of the specific cylindrical coordinates system to deform the second spring portions 152 resiliently. Then, the regulation by the second regulating portions 352 for the second regulated portions 160 is released, and the connector 100 can be further turned to transition toward the third state. Here, an outward direction in the radial direction of the turning of the connector 100 can be divided into a rearward direction component in the front-rear direction and an upward direction component in the up-down direction. As understood from FIGS. 7, 23 and 31, in the present embodiment, a position of the connector 100 in the second state is considerably closer to a position of the connector 100 in the first state than a position of the connector 100 in the third state. Accordingly, when the connector 100 is in the second state, the rearward direction component is considerably larger than the upward direction component. Therefore, when the second operation portion 154 is operated in a state where each of the second regulated portions 160 is regulated by the second regulating portion 352 corresponding thereto, the regulation by the second regulating portions 352 for the second regulated portions 160 can be released by moving the second operation portion 154 rearward. Thus, the connector 100 can transition to the third state through the second state. While the connector 100 transitions to the third state through the second state, the fitting regulated portion 170 rides over the fitting regulating portion 354 and is moved toward the position of the connector 100 in the third state. In the transitioning of the connector 100 from the second state to the third state, the power-supply terminal 210 is disconnected from the mating power-supply terminals 410.

As mentioned above, in the connector device 10 of the present embodiment, in order that the connector 100 transitions from the first state to the third state, the operation of the first release portion 340 and the operation of the second release portion 150 must be separately performed. Thus, the connector device 10 according to the present embodiment can certainly ensure a sufficient time which is elapsed since electrical disconnection between the detection terminal 230 and the mating detection terminals 430 until electrical disconnection between the power-supply terminal 210 and the mating power-supply terminals 410.

Second Embodiment

Referring to FIGS. 36 to 40, a connector device 10A according to a second embodiment of the present invention comprises a connector 100A and a mating connector 300A. The mating connector 300A is mateable with the connector 100A. The connector device 10A according to the second embodiment of the present invention has a structure similar to the structure of the connector device 10 according to the aforementioned first embodiment as shown in FIG. 1 except for a prevention portion 390A. Accordingly, components similar to those of the first embodiment among components illustrated in FIGS. 36 to 40 will be designated by the same reference numerals as those of the first embodiment. As for directions and orientations in the present embodiment, expressions same as those of the first embodiment will be used hereinbelow.

As understood from FIGS. 27 and 36 to 40, the mating connector 300A comprises a mating housing 310A, two mating power-supply terminals 410 (not shown), a mating sub-connector 420 and an eyelet 440. As for the aforementioned components of the mating connector 300A, the mating power-supply terminals 410, the mating sub-connector 420 and the eyelet 440 have structures same as those of the mating connector 300 of the aforementioned first embodiment. Accordingly, detailed explanation about those components is omitted.

As shown in FIGS. 36 to 40, dissimilar to the mating housing 310 of the first embodiment, the mating housing 310A is further provided with the prevention portion 390A. Except that the mating housing 310A is provided with the prevention portion 390A, the mating housing 310A has a structure similar to that of the mating housing 310 of the first embodiment. Accordingly, detailed explanation about the components other than the prevention portion 390A is omitted.

As shown in FIGS. 36 to 40, the prevention portion 390A is a beam which is provided so as to extend in the axis direction between a first operation portion 344 and a second operation portion 154 when the connector 100A is in a first state. In other words, the prevention portion 390A of the present embodiment is located between the first operation portion 344 and the second operation portion 154 in the front-rear direction when the connector 100A is in the first state. More specifically, when the connector 100A is in the first state, the prevention portion 390A of the present embodiment is located rearward of the first operation portion 344 in the front-rear direction and is located forward of the second operation portion 154 in the front-rear direction. When the connector 100A is in the first state, an upper end of the prevention portion 390A of the present embodiment is located above an upper end of the first operation portion 344 in the up-down direction and is located at a position similar to a position of an upper end of the second operation portion 154 in the up-down direction. When the connector 100A is in the first state, a front surface of the prevention portion 390A of the present embodiment intersects with the front-rear direction.

As understood from FIGS. 4, 20, 28 and 36 to 40, similar to the connector 100, the connector 100A is able to take on any of three states including the first state, a second state and a third state with respect to the mating connector 300A. More specifically, as understood from FIGS. 4, 12, 20, 28 and 36 to 40, similar to the connector 100, the connector 100A is able to take on any of four states including the first state, the second state, the third state and a fourth state with respect to the mating connector 300A. The first state, the second state, the third state and the fourth state, on any of which the connector 100A is able to take, are similar to those of the connector 100 of the first embodiment. Accordingly, detailed explanation about those states is omitted.

As understood from FIGS. 2 and 36 to 40, the connector 100A comprises a housing 110A, a power-supply terminal 210 (not shown) and a detection terminal 230 (not shown). As for the aforementioned components of the connector 100A, the power-supply terminal 210 and the detection terminal 230 have structures same as those of the connector 100 of the first embodiment. Accordingly, detailed explanation about those components is omitted.

As shown in FIGS. 36 to 40, dissimilar to the housing 110 of the first embodiment, the housing 110A comprises no prevention portion. Except that the housing 110A has no prevention portion, the housing 110A has a structure similar to that of the housing 110 of the first embodiment. Accordingly, detailed explanation about the components of the housing 110A is omitted.

As understood from FIGS. 36 to 40, when the connector 100A is in the first state, the first operation portion 344 protrudes upward from an opening 112 of the housing 110A while being located below an upper edge of the prevention portion 390A of the mating housing 310A in the front-rear direction. Accordingly, the first operation portion 344 can be operated intentionally and can be prevented from being operated by accident.

As shown in FIGS. 36 to 40, when the connector 100A is in the first state, the prevention portion 390A is located between a first release portion 340 and a second release portion 150 in the operating direction and prevents the second release portion 150 from being subsequently operated upon operation of the first release portion 340 along the operating direction. More specifically, when an operator hooks his/her finger on the first operation portion 344 of the first release portion 340 to operate the first release portion 340 along the operating direction under a state where the connector 100A is in the first state, the finger of the operator abuts against the prevention portion 390A to be stopped in its movement before abutting against the second operation portion 154 of the second release portion 150. Accordingly, the second release portion 150 is prevented from being subsequently operated upon the operation of the first release portion 340.

Although the prevention portion 390A of the present embodiment is the beam which is provided so as to extend in the axis direction between the first operation portion 344 and the second operation portion 154 when the connector 100A is in the first state, the present invention is not limited thereto. The prevention portion 390A may be a beam which is provided so as to intersect with the operating direction between the first operation portion 344 and the second operation portion 154 when the connector 100A is in the first state. Also in that case, when an operator hooks his/her finger on the first operation portion 344 of the first release portion 340 to operate the first release portion 340 along the operating direction under the state where the connector 100A is in the first state, the finger of the operator abuts against the prevention portion 390A to be stopped in its movement before abutting against the second operation portion 154 of the second release portion 150. Accordingly, the second release portion 150 is prevented from being subsequently operated upon the operation of the first release portion 340.

Although the specific explanation about the present invention is made above referring to the embodiments, the present invention is not limited thereto and is susceptible to various modifications and alternative forms.

In the aforementioned embodiments, the first release portion 340 moves the first regulating portions 332 to release the regulation by the first regulating portions 332 for the first regulated portions 132. The first release portion 340 may, however, move the first regulated portions 132 to release the regulation by the first regulating portions 332 for the first regulated portions 132. In such a case, the first release portion 340 may be provided to the housing 110, 110A of the connector 100, 100A. Moreover, in the aforementioned embodiments, the second release portion 150 moves the second regulated portions 160 to release the regulation by the second regulating portions 352 for the second regulated portions 160. The second release portion 150 may, however, move the second regulating portions 352 to release the regulation by the second regulating portions 352 for the second regulated portions 160. In such a case, the second release portion 150 may be provided to the mating housing 310, 310A of the mating connector 300, 300A. At any rate, it is sufficient that one of the first release portion 340 and the second release portion 150 is provided to one of the housing 110, 110A of the connector 100, 100A and the mating housing 310, 310A of the mating connector 300, 300A while a remaining one of the first release portion 340 and the second release portion 150 is provided to a remaining one of the housing 110,110A of the connector 100, 100A and the mating housing 310, 310A of the mating connector 300, 300A. Alternatively, both of the first release portion 340 and the second release portion 150 may be provided to the housing 110,110A of the connector 100,100A or the mating housing 310, 310A of the mating connector 300, 300A. In any of the aforementioned cases, the prevention portion 390, 390A may be provided to any of the housing 110, 110A of the connector 100, 100A and the mating housing 310, 310A of the mating connector 300, 300A.

Although each of the first operating orientation and the second operating orientation of the present embodiments is the orientation extending away from the rotation axis 320 in the radial direction around the rotation axis 320, the present invention is not limited thereto. Each of the first operating orientation and the second operating orientation may be an orientation extending to the rotation axis 320 in the radial direction around the rotation axis 320.

In the aforementioned embodiments, the fitting regulating portion 354 and the fitting regulated portion 170 are designed so that the second release portion 150 also serves as the additional release portion. However, the fitting regulating portion 354 and the fitting regulated portion 170 may be designed so that the first release portion 340 also serves as the additional release portion or that the additional release portion may be provided independently. In addition, the additional release portion may be provided to the connector 100, 100A or the mating connector 300, 300A. It is desirable, however, that the second release portion 150 also serves as the additional release portion. This is because not only it is possible to avoid complication of the structure of the connector device 10, 10A but also the fitting regulated portion 170 can be located more far away from the rotation axes. Locating the fitting regulated portion 170 away from the rotation axes prevents the fitting regulating portion 354 and the fitting regulated portion 170 from receiving a strong force when the connector 100, 100A is regulated in rotation.

In the aforementioned embodiments, each of the axis portions 120 is the bearing while each of the mating axis portions 320 is the rotation axis. However, the present invention is not limited thereto. Each of the axis portions 120 may be a rotation axis while each of the mating axis portions 320 may be a bearing. In other words, one of the axis portion 120 and the mating axis portion 320 may be a rotation axis while a remaining one of the axis portion 120 and the mating axis portion 320 may be a bearing.

In the aforementioned embodiments, each of the guide portions 180 is the arc-shaped groove while each of the mating guide portions 380 is the protrusion. However, the present invention is not limited thereto. Each of the guide portions 180 may be a protrusion while each of the mating guide portions 380 may be a groove.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector device comprising a connector and a mating connector which is mateable with the connector, wherein:
    the connector comprises a housing, a power-supply terminal and a detection terminal;
    each of the power-supply terminal and the detection terminal is held by the housing;
    the housing is provided with a first regulated portion and a second regulated portion;
    the mating connector comprises a mating housing, a mating power-supply terminal and a mating detection terminal;
    each of the mating power-supply terminal and the mating detection terminal is held by the mating housing;
    the mating housing is provided with a first regulating portion and a second regulating portion;
    one of the housing and the mating housing is provided with a first release portion;
    one of the housing and the mating housing is provided with a second release portion;
    one of the housing and the mating housing is provided with a prevention portion;
    the connector is able to take on any of three states with respect to the mating connector;
    the three states include a first state, a second state and a third state;
    when the connector is in the first state, the power-supply terminal is connected with the mating power-supply terminal while the detection terminal is connected with the mating detection terminal;
    when the connector is in the second state, the power-supply terminal is connected with the mating power-supply terminal while the detection terminal is not connected with the mating detection terminal;
    when the connector is in the third state, the power-supply terminal is not connected to the mating power-supply terminal while the detection terminal is not connected to the mating detection terminal;
    when the connector is tried to transition from the first state to the second state, the first regulated portion is brought into abutment with the first regulating portion and regulated to prevent the connector from transitioning to the second state;
    when the first release portion is operated along an operating direction, regulation by the first regulating portion for the first regulated portion is released;
    when the connector is tried to transition from the second state to the third state, the second regulated portion is brought into abutment with the second regulating portion and regulated to prevent the connector from transitioning to the third state;
    when the second release portion is operated, regulation by the second regulating portion for the second regulated portion is released; and
    when the connector is in the first state, the prevention portion is located between the first release portion and the second release portion in the operating direction and prevents the second release portion from being subsequently operated upon operation of the first release portion.

2. The connector device as recited in claim 1, wherein the first release portion has a first operation portion;
the second release portion has a second operation portion; and
the prevention portion is a beam which is provided so as to intersect with the operating direction between the first operation portion and the second operation portion when the connector is in the first state.

3. The connector device as recited in claim 1, wherein:
the first release portion is operable in a first operating orientation
the second release portion is operable in a second operating orientation; and
when the connector is in the first state, the first operating orientation and the second operating orientation coincide with each other.

4. The connector device as recited in claim 3, wherein:
the housing is formed with an axis portion;
the mating housing is formed with a mating axis portion;
one of the axis portion and the mating axis portion is a rotation axis with an axis direction;
a remaining one of the axis portion and the mating axis portion is a bearing;
when the axis portion and the mating axis portion are combined, the connector is rotatable around the rotation axis while taking on a state between the first state and the third state with respect to the mating connector; and
when the connector is in a state between the first state and the third state, the connector is located above the mating connector in an up-down direction perpendicular to the axis direction of the rotation axis.

5. The connector device as recited in claim 4, wherein each of the first operating orientation and the second operating orientation is an orientation or another orientation, the orientation extending to the rotation axis in a radial direction around the rotation axis, the another orientation extending away from the rotation axis in the radial direction around the rotation axis.

* * * * *